(12) United States Patent
Sorenson et al.

(10) Patent No.: US 11,599,516 B1
(45) Date of Patent: Mar. 7, 2023

(54) SCALABLE METADATA INDEX FOR A TIME-SERIES DATABASE

(71) Applicant: Amazon Technologies, Inc., Seattle, WA (US)

(72) Inventors: James Christopher Sorenson, Seattle, WA (US); Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 16/910,858

(22) Filed: Jun. 24, 2020

(51) Int. Cl.
*G06F 16/30* (2019.01)
*G06F 16/22* (2019.01)
*G06F 16/2458* (2019.01)
*G06F 16/27* (2019.01)

(52) U.S. Cl.
CPC ...... *G06F 16/2282* (2019.01); *G06F 16/2477* (2019.01); *G06F 16/27* (2019.01)

(58) Field of Classification Search
CPC ... G06F 16/2282; G06F 16/27; G06F 16/2477
See application file for complete search history.

(56) References Cited

U.S. PATENT DOCUMENTS

| | | | |
|---|---|---|---|
| 8,132,046 B2 | 3/2012 | Varghese | |
| 8,219,581 B2 | 7/2012 | Roy et al. | |
| 8,276,154 B2 | 9/2012 | Toub et al. | |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 | 12/2013 | Nordstrom et al. | |
| 9,286,001 B2 * | 3/2016 | Skjolsvold | G06F 3/0635 |
| 9,449,122 B2 | 9/2016 | Haas et al. | |
| 9,607,019 B1 | 3/2017 | Swift et al. | |
| 9,607,067 B2 | 3/2017 | Haas et al. | |

(Continued)

FOREIGN PATENT DOCUMENTS

WO 2015070232 5/2015

OTHER PUBLICATIONS

U.S. Appl. No. 16/116,791, filed Aug. 29, 2018, Mustafa Ozan Ozen et al.

(Continued)

*Primary Examiner* — Khanh B Pham
(74) *Attorney, Agent, or Firm* — Robert C. Kowert; Kowert, Hood, Munyon, Rankin & Goetzel, P.C.

(57) ABSTRACT

Methods, systems, and computer-readable media for a scalable metadata index for a time-series database are disclosed. A time-series database receives a query comprising spatial and temporal boundaries of requested time-series data in a table. Using traversal of a metadata index, the time-series database determines one or more storage locations in the one or more data sources corresponding to the spatial and temporal boundaries. The metadata index includes a root node representing spatial and temporal boundaries of the table. The metadata index includes one or more leaf nodes representing the spatial and temporal boundaries of the requested time-series data. The one or more leaf nodes indicate the one or more storage locations in the one or more data sources. The time-series database obtains one or more elements of the requested time-series data from the one or more storage locations in the one or more data sources.

20 Claims, 19 Drawing Sheets

(56) References Cited

U.S. PATENT DOCUMENTS

| | | | |
|---|---|---|---|
| 9,626,374 | B2 | 4/2017 | Hirsch et al. |
| 9,672,257 | B2 | 6/2017 | Tobin et al. |
| 9,773,015 | B2 | 9/2017 | Guo et al. |
| 9,817,727 | B2 | 11/2017 | McAlister et al. |
| 9,836,492 | B1 | 12/2017 | Hermanson |
| 9,934,107 | B1 | 4/2018 | Chikkanayakanahally et al. |
| 10,007,513 | B2 | 6/2018 | Malladi et al. |
| 2005/0071349 | A1* | 3/2005 | Jordan ............ G06F 16/283 |
| 2010/0106934 | A1* | 4/2010 | Calder ............ G06F 3/0605 711/173 |
| 2015/0052173 | A1 | 2/2015 | Leonard et al. |
| 2017/0177546 | A1 | 6/2017 | Heinz et al. |
| 2018/0246934 | A1* | 8/2018 | Arye ............ G06F 16/2272 |
| 2020/0167360 | A1* | 5/2020 | Rath ............ G06F 3/0644 |
| 2021/0232557 | A1* | 7/2021 | Zhang ............ G06F 16/1734 |

OTHER PUBLICATIONS

U.S. Appl. No. 16/176,629, filed Oct. 31, 2018, Dumanshu Goyal.
U.S. Appl. No. 16/216,580, filed Dec. 11, 2018, Dumanshu Goyal.
U.S. Appl. No. 16/199,102, filed Nov. 23, 2018, Timothy A. Rath.
U.S. Appl. No. 16/199,103, filed Nov. 23, 2018, Timothy A. Rath.
U.S. Appl. No. 16/199,078, filed Nov. 23, 2018, Timothy A. Rath.
U.S. Appl. No. 16/453,914, filed Jun. 26, 2019, Gaurav Saxena.
Anonymous, "Amazon Kinesis Streams: Developer Guide", Dated Nov. 16, 2017, From http://web.archive.org/web/20171116223501if_/http://docs.aws.amazon.com:80/streams/latest/dev/kinesis-dg.pdf, pp. 1-143.
Anonymous, Amazon Kinesis Firehose: Developer Guide, dated Oct. 25, 2017, From http://web.archive.org/web/20171025072815if_/http://docs.aws.amazon.com:80/firehose/latest/dev/firehose-dg.pdf, p. 1-66.
U.S. Appl. No. 16/357,224, filed Mar. 18, 2019, Dumanshu Goyal.
U.S. Appl. No. 16/219,686, filed Dec. 13, 2018, Dumanshu Goyal.
U.S. Appl. No. 16/267,330, filed Feb. 4, 2019, Dumanshu Goyal.
U.S. Appl. No. 16/287,822, filed Feb. 27, 2019, Dumanshu Goyal.
U.S. Appl. No. 16/455,591, filed Jun. 27, 2019, Gaurav Saxena.
U.S. Appl. No. 16/579,715, filed Sep. 23, 2019, Dumanshu Goyal.
U.S. Appl. No. 16/579,717, filed Sep. 23, 2019, Dumanshu Goyal.
U.S. Appl. No. 16/831,637, filed Mar. 26, 2020, Dumanshu Goyal.
U.S. Appl. No. 16/831,608, filed Mar. 26, 2020, Dumanshu Goyal.
U.S. Appl. No. 16/831,614, filed Mar. 26, 2020, Dumanshu Goyal.
U.S. Appl. No. 16/831,599, filed Mar. 26, 2020, Dumanshu Goyal.
Layali K. Rashid et al., "Evaluating the Performance of CSB+-Trees on Multithreaded Architectures," 2007 Canadian Conference on Electrical and Computer Engineering, Apr. 2007, pp. 1-4.
Richard A. Hankins et al., "Effect of Node Size on the Performance of Cache-Conscious B+-trees," 2003 ACM SIGMETRICS International Conference, Jan. 2003, pp. 1-21.
U.S. Appl. No. 17/349,786, dated Jun. 16, 2021, Sudipto Das.
U.S. Appl. No. 17/234,372, dated Apr. 19, 2021, Evgeniy Retyunskiy.

* cited by examiner

US 11,599,516 B1

SCALABLE METADATA INDEX FOR A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
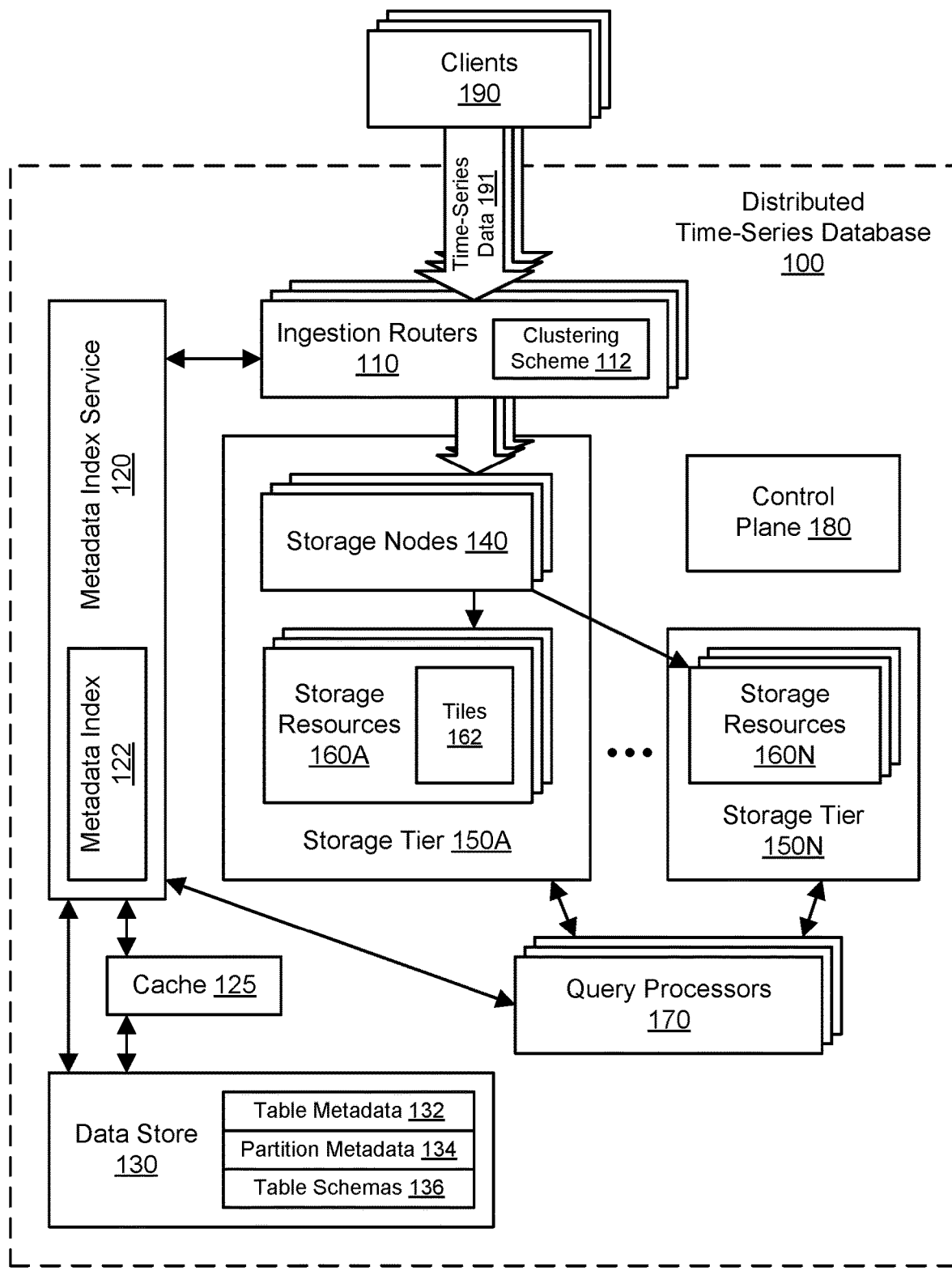
FIG. 1 illustrates an example system environment for a distributed time-series database including a scalable metadata index, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for a scalable metadata index for a time-series database are described. A distributed time-series database hosted in the cloud may offer high availability and high throughput for both ingestion and queries of time-series data on behalf of multiple clients. The time-series database may include a set of ingestion routers that receive and spatially partition time-series data into a set of non-overlapping partitions. A particular time series may be defined by a schema that includes components such as one or more dimension names and a measure name. The time-series database may further include a set of storage nodes that process the partitioned time-series data. For example, the storage nodes may write elements of time-series data to one or more storage tiers, such as a "hot" tier that offers low-latency and high-availability write and read access to a set of distributed storage resources (e.g., as implemented using database clusters). In the hot tier, time-series data may be stored in two-dimensional tiles which are defined by spatial and temporal boundaries. The time-series database may further include a set of query processors that perform queries of the time-series data in the one or more storage tiers.

To maintain high availability and high throughput for ingestion of time-series data, the time-series database may use a metadata index to identify the locations to which incoming time-series data points within particular time and space ranges are routed. Similarly, to maintain high availability and high throughput for queries of time-series data, the time-series database may use a metadata index to identify the locations to which queries for particular time and space ranges are routed. The metadata index may be maintained by a centralized service that authoritatively, consistently, and durably stores the locations and metadata of time-series data. The metadata index may be highly scalable and highly available. In some embodiments, the metadata index may support fast lookups (e.g., millisecond lookups) for billions of two-dimensional tiles and trillions of ingested data points per day. The metadata index may be built on a data store (e.g., a NoSQL data store) that provides scalability and durability, and the metadata index may distribute workload heat evenly across a caching fleet associated with the underlying data store.

The metadata index may be implemented using a directed acyclic graph (DAG) or other tree-like data structure. The graph may include various types of nodes such as a root index node representing a high-level meta tile, optionally one or more intermediate index nodes representing portions of the high-level meta tile, and a layer of leaf nodes that include pointers to location data for particular tiles in the underlying data store. Particular nodes may be associated with particular spatial and temporal ranges of time-series data. In some embodiments, the graph representation may be kept balanced by bounding the depth and thereby providing an upper bound for single data point lookup latencies. The graph may grow from the root node, and an index node lacking capacity for additional child node references may leverage its parent node to rebalance its child references across multiple index nodes. When two-dimensional tiles in the time-series database are repartitioned (e.g., split or merged), the graph may allow low-latency atomic updates. When data sources are trimmed over time (e.g., due to expiration of data points according to a retention policy), corresponding nodes in the graph may also be removed. In some embodiments, to enable efficient lookup for data sources in a query, the metadata index may prune metadata based on input space and time bounding boxes such that meta tiles do not overlap in terms of bounding boxes.

As one skilled in the art will appreciate in light of this disclosure, embodiments may be capable of achieving certain technical advantages, including some or all of the following: (1) improving the availability and latency of a distributed time-series database for ingestion by using a fast metadata index to determine where to route incoming data points; (2) improving the availability and latency of a distributed time-series database for queries by using a fast metadata index to determine where to route queries; (3) improving the availability and latency of a distributed time-series database by rebalancing nodes in a metadata index; (4) reducing the use of storage by removing nodes in a metadata index when the corresponding data points expire from the time-series database; and so on.

FIG. 1 illustrates an example system environment for a distributed time-series database including a scalable metadata index, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data.

The ingested time-series data 191 may represent a large number (high cardinality) of individual time series. An individual time series may include a sequence of values or observations (e.g., for a feature of a system or a phenomenon) that can be plotted over time. An individual time series may be uniquely identified by a set of dimensions (with dimension values) such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on, as well as the measure name. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

A particular time series may be defined by a schema that includes components such as one or more dimension names (e.g., "Region") having one or more dimension values (e.g., "US-West") and a measure name (e.g., "temperature"). As ingested by the time-series database 100, an element of time-series data may include all the schema components (including dimension values) as well as a measure value that represents a particular data point in the time series. The time-series database 100 may be referred to as "schema-less" in that a customer need not formally specify the schema using a control plane 180 or other channel separate from the ingested data 191. Thus clients 190 may begin providing the data 191 to the database 100 more quickly and without performing additional control-plane operations or other configuration tasks.

The ingestion routers 110 may use a clustering scheme 112 to divide the ingested data 191 into various partitions. The clustering scheme 112 may co-locate related time series for optimization of queries and other tasks. The clustering scheme 112 may represent a multi-level hashing scheme in which a hash value for a time series is generated by concatenating hash values for different components of the schema (and dimension values) for the time series. The clustering scheme 112 may be based (at least in part) on schemas and dimension values for individual time series that are derived from ingested data 191 and not necessarily formally specified by customers. For example, to generate a hash representing an individual time series, a clustering scheme 112 for a particular table may first hash the measure name for the various time series, then concatenate a hash for the dimension names, then concatenate a hash for the dimension values. By representing the measure name as a prefix in the hash for an individual time series, various time series that have the same measure name may be clustered together in the partitions and throughout their remaining lifecycle in the database 100. As another example, another clustering scheme 112 may first hash the dimension names, then concatenate a hash for the dimension values, then concatenate a hash for the measure name. As yet another example, another clustering scheme 112 may interleave the dimension names and dimension values (e.g., a hash of a first dimension name, a hash of a first dimension value, a hash of a second dimension name, a hash of a second dimension value, and so on) and then concatenate a hash for the measure name. In one embodiment, the clustering scheme 112 may represent a default scheme that is intended to optimize query performance for a large number (e.g., a majority) of queries for a given table. In one embodiment, the clustering scheme 112 may be selected by a customer, e.g., on a table-by-table basis.

In addition to the ingestion routers 110, the database 100 may include hosts such as storage nodes 140 and query processors 170. A fleet of storage nodes 140 may take the partitioned time-series data from the ingestion routers 110, potentially process the data in various ways, and add the data to one or more storage tiers 150A-150N. For example, the storage nodes 140 may write data from one partition to a "hot" storage tier 150A at a lower latency and to a "cold" storage tier 150N at a higher latency. In various embodiments, storage nodes may perform reordering, deduplication, aggregation of different time periods, rollups, and other transformations on time series data. Storage nodes 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized. By co-locating related time-series using the clustering scheme 112, tasks such as aggregations and cross-series rollups may be optimized or otherwise have their performance improved.

The data 191 may be routed from the routers 110 to the storage nodes 140 according to routing metadata, e.g., that maps different time series or ranges of the data to different storage nodes. In one embodiment, the routing metadata may represent the assignment of tile leases to particular storage nodes. In one embodiment, a given storage node may be assigned to one and only one partition at a time. In one embodiment, the storage nodes 140 may organize the time series in tables. The storage nodes 140 may also be referred to as writers or table builders. A table may store multiple time series. A table may be a named entity that stores related time series that are usable by the same application and often managed by the same customer of the database 100. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, queries may specify time intervals and/or dimension names and/or dimension values instead of or in addition to individual measures.

The time-series database 100 may include a metadata index service 120 that maintains a metadata index 122. The metadata index service 120 may represent a centralized component that authoritatively, consistently, and durably stores the locations and metadata of time-series data. To maintain high availability and high throughput for ingestion of time-series data, the time-series database 100 may use the metadata index service 120 to identify the locations to which incoming time-series data points within particular time and space ranges are routed. To maintain high availability and high throughput for queries of time-series data, the time-series database 100 may use the metadata index service 120 to identify the locations to which queries for particular time and space ranges are routed. The metadata index 122 may be highly scalable and highly available. In some embodiments, the metadata index 122 may support fast lookups (e.g., millisecond lookups) for billions of two-dimensional tiles and trillions of ingested data points per day. The metadata index 122 may be built on a data store 130 (e.g., a NoSQL data store) that provides scalability and durability. The metadata index service 120 may leverage a cache 125 for performance and scalability. The metadata index service 120 may distribute workload heat evenly across the caching fleet to prevent "hot spots."

The metadata index service 120 may index metadata 132 associated with individual customer tables, e.g., the table name to table ID resolution, the ingestion/retention period, and other database/table metadata. Customer table metadata 132 may be updated in the underlying data store 130 by the ingestion router(s). Table metadata 132 updates may be triggered by operations such as table creation, table updating, table deletion, and so on. Table metadata updates in the underlying data store 130 may be propagated to the cache 125 on a best-effort basis. The metadata index service 120 may index metadata 134 associated with individual tiles, e.g., the location of customer data partitions across the database clusters 160A and other storage locations 160N, as indexed across time and space. Tile metadata 134 updates such as tile creation, splits, merges, and deletions may be stored by the storage nodes in a tile metadata table in the data store 130. Tile metadata 134 updates in the underlying data store 130 may be propagated to the cache 125 on a best-effort basis. The metadata index service 120 may index table schemas 136, e.g., dimension names and measure names. Table schema 136 updates may be stored by the storage nodes in the data store 130 and may be propagated to the cache on a best-effort basis. Table schemas 36 may be versioned, e.g., such that any addition of one or more dimension names to a schema results in a higher version number. Using versioning of table schemas 136, schema changes may be detected at runtime, e.g., when queries are performed. The metadata index service 120 may cache metadata entries by request, and a cache miss may result in a call to the data store 130 and population of the cache 125 on a best-effort basis.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits customers (e.g., developers of applications) and other systems to perform management and modeling of time series data. For example, a component for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, customers may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks such as one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

Using the clustering scheme 112, various time series that are similar (e.g., that have the same measure name) may be clustered together in the storage tier(s) 150A-150N. Queries for time-series data having the same measure name (or other hash prefix in the selected clustering scheme) may then be performed more efficiently. The same clustering scheme 112 may be used throughout the database 100 to optimize both storage and retrieval of time-series data. For example, one of the query processors 170 may use the same clustering (hashing) scheme 112 to identify the partition(s) associated with the hash of the measure name (or other prefix of the partition hash) and implement the query only using the identified partition(s) in the relevant storage tier(s).

In one embodiment, one or more components of the distributed database 100, such as hosts 110, 140 and 170, the metadata index service 120, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, storage nodes 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the distributed database 100, may be offered to clients in exchange for fees.

In one or more of the storage tiers such as tier 150A, the time-series data may be partitioned into a set of tiles 162 along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism. The storage tier 150A may use a plurality of database clusters to store time-series data, e.g., using two-dimensional tiles 162.

In some embodiments, a lease to a given tile may be assigned to one and only one of the storage nodes 140 at a given time. A tile lease may permit a particular storage node to write time-series data to that tile, to the exclusion of other storage nodes. A tile lease may last indefinitely, e.g., until the tile expires (and is removed from the storage tier 150A) or another storage node acquires the lease. Time-series data in a tile may be removed from one storage tier 150A and moved to another storage tier according to a retention policy based (at least in part) on the age of the data. The storage resources 160A (e.g., database clusters) of the storage tier 150A may store tile lease metadata describing aspects of tile leases. The storage resources 160A (e.g., database clusters) of the storage tier 150A may use the lease metadata to approve or deny requests from particular storage nodes to write time-series data to particular tiles. For example, the lease metadata may indicate lease identifiers, storage node identifiers, and/or other information usable to approve or deny requests to write time-series data to particular tiles. As discussed herein, tile leases may be assigned to storage nodes using inline data path operations and not necessarily requiring use of the control plane 180. Tile leases may be assigned initially on a random (or pseudo-random) basis, and a refinement mechanism may be used for heat balancing among storage nodes. Aspects of the lease metadata (e.g., the assignment of particular leases to particular storage nodes) may be stored using a centralized lease metadata cache 120 to facilitate the propagation of updates among the ingestion routers 110, storage nodes 140, and database clusters 160A.

Figure 10:
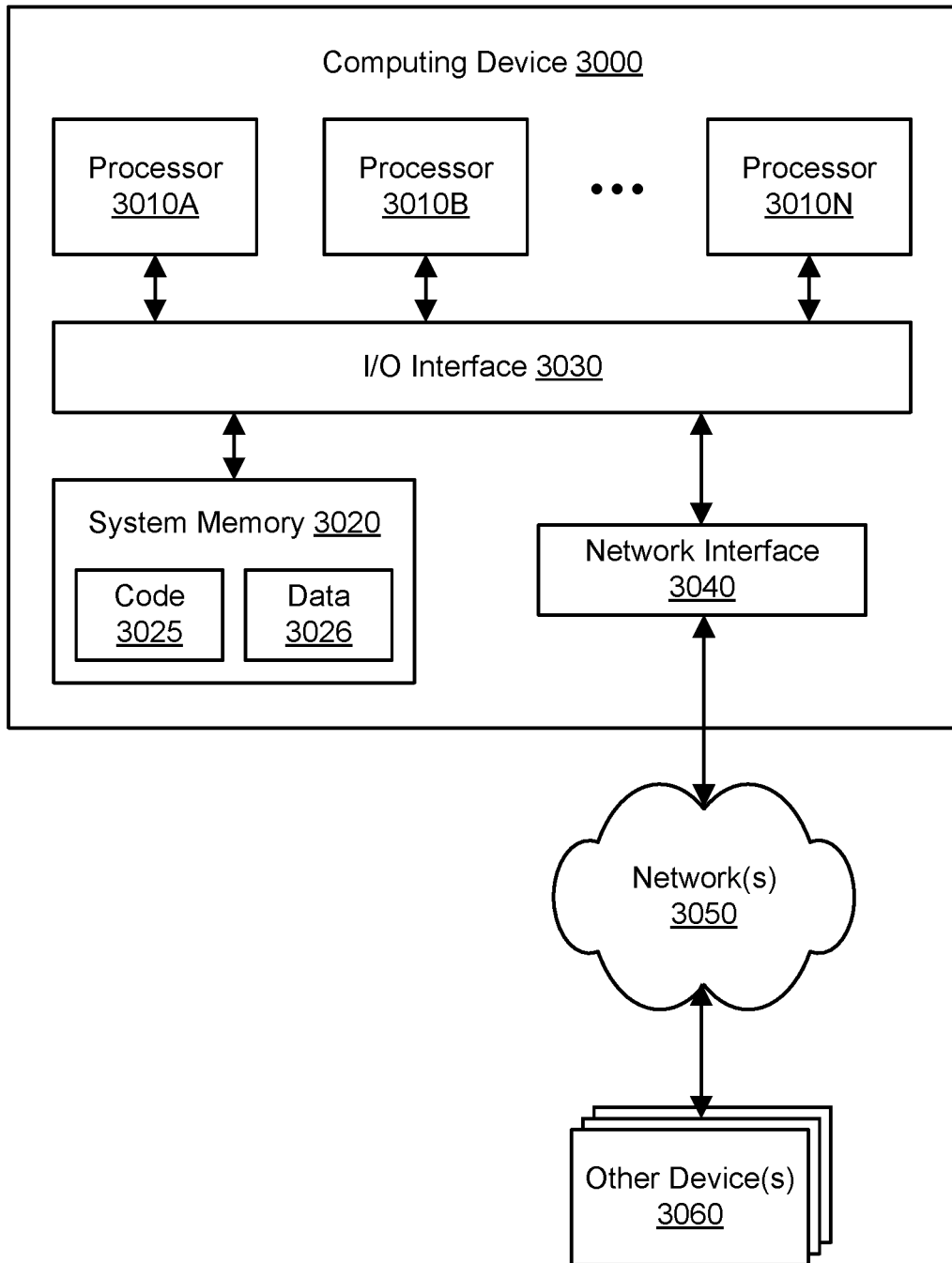
FIG. 10 illustrates an example computing device that may be used in some embodiments.

In various embodiments, components of the distributed database 100, such as the ingestion routers 110, streaming service 120, storage nodes 140, storage resources 160A-160N, query processors 170, and/or metadata index service 120 may be implemented using any suitable number and configuration of computing devices, any of which may be implemented by the example computing device 3000 illustrated in FIG. 10. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks.

Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. Client devices 190 may be managed or owned by one or more customers of the database 100. For example, a particular customer may be a business that sells sensor devices for installation in residences and businesses, and those sensor devices may represent the client devices 190. In one embodiment, the client devices may be implemented using any suitable number and configuration of computing devices, any of which may be implemented by the example computing device 3000 illustrated in FIG. 10. Clients 190 may convey network-based service requests to the ingestion router fleet 110 via one or more networks, e.g., to supply a stream of data for processing using the storage nodes 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
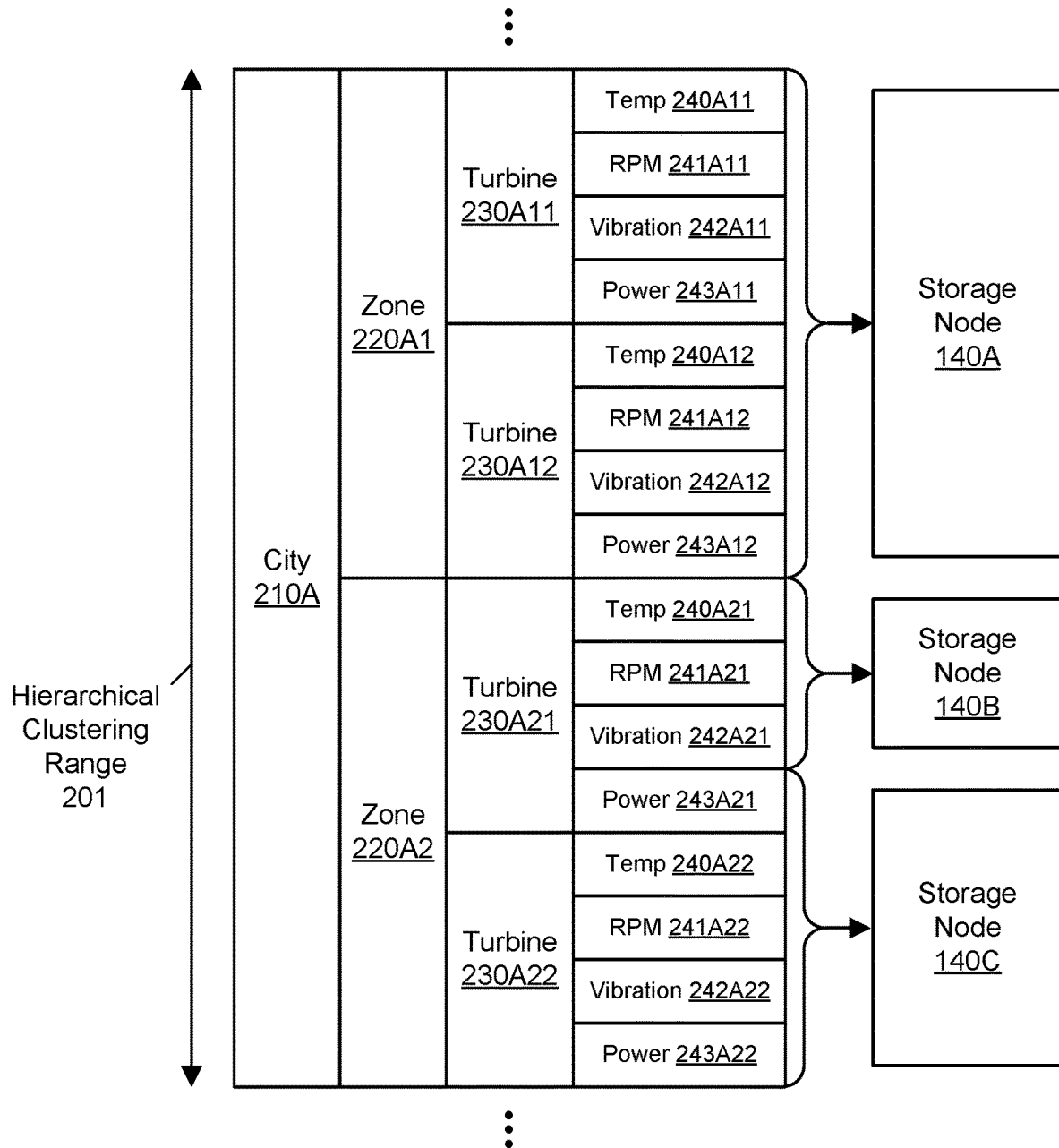
FIG. 2 illustrates an example of hierarchical clustering of ingested time-series data in a distributed time-series database including a scalable metadata index, according to some embodiments.

FIG. 2 illustrates an example of hierarchical clustering of ingested time-series data in a distributed time-series database including a scalable metadata index, according to some embodiments. The ingestion routers 110 may organize time-series data along a hierarchical clustering range 201. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering. The hash-based clustering scheme may have multiple levels.

As shown in the example of FIG. 2, an example of a hierarchical relationship path for client devices representing wind-turbine sensors may be Country, State, City, Zone, Wind Turbine, and Metric. A portion of data having this hierarchical scheme may include data for a particular city 210A, two zones 220A1 and 220A2, and two turbines per zone 230A11, 230A12, 230A21, and 230A22. Turbine 230A11 may include measurements for temperature 240A11, RPM 241A11, vibration 242A11, and power 243A11. Turbine 230A12 may include measurements for temperature 240A12, RPM 241A12, vibration 242A12, and power 243A12. Turbine 230A21 may include measurements for temperature 240A21, RPM 241A21, vibration 242A21, and power 243A21. Turbine 230A22 may include measurements for temperature 240A22, RPM 241A22, vibration 242A22, and power 243A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 2 may be reorganized (for future data points) with temp, RPM, vibration, and power as higher-level constructs than the turbine identifiers.

The data points for the hierarchy shown in FIG. 2 may be mapped to various durable partitions by the ingestion routers 110. As shown in the example, the time-series data may be mapped and routed to storage nodes 140A, 140B, and 140C. In one embodiment, different numbers of time series may be mapped to different partitions based (at least in part) on the ingestion rate of those time series. Partitions may be split or merged as appropriate to adapt to changing ingestion rates for various time series. A particular partition may be routed to a particular storage node, e.g., for writing data from the partition to a particular storage tier. As shown in the example of FIG. 2, a first partition may be routed to storage node 140A, another partition may be routed to storage node 140B, and yet another partition may be routed to storage node 140C.

Figure 3:
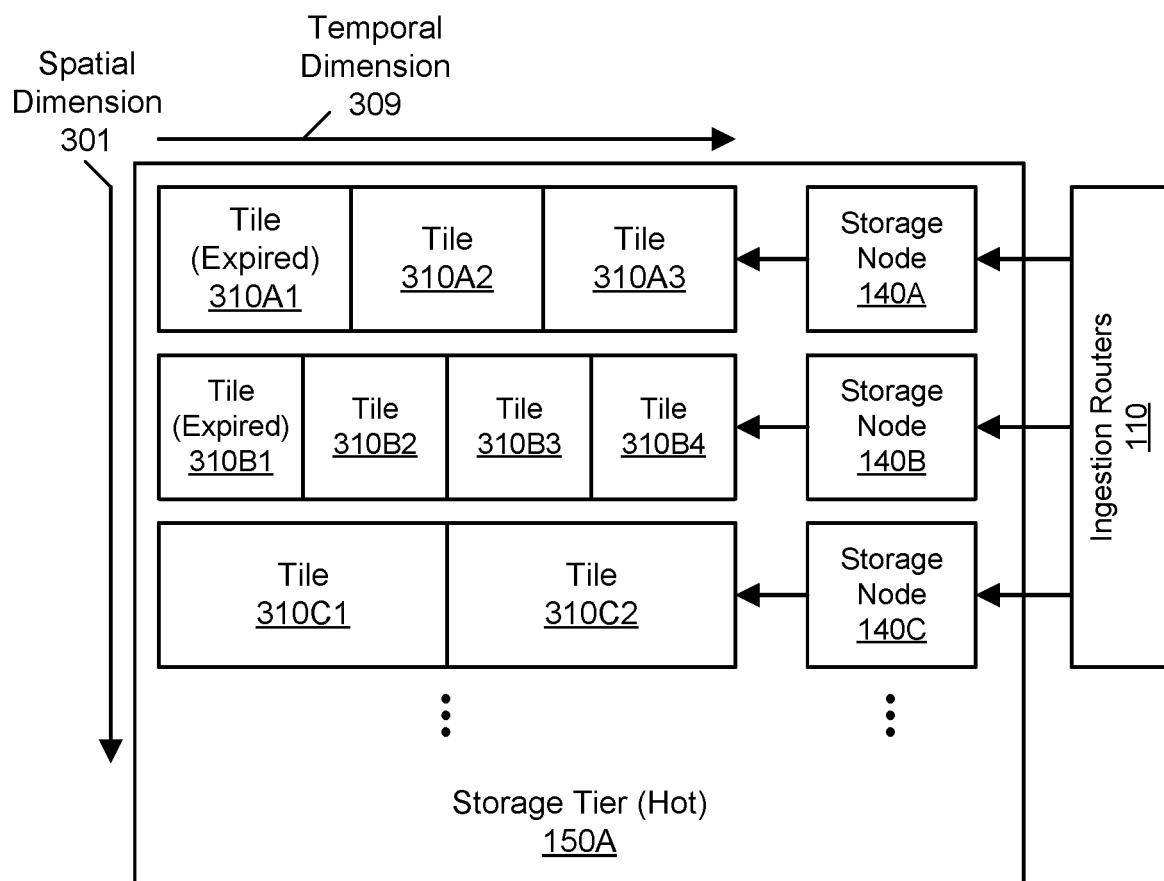
FIG. 3 illustrates an example of storage of time-series data using two-dimensional tiles in a hot tier in a distributed time-series database including a scalable metadata index, according to some embodiments.

FIG. 3 illustrates an example of storage of time-series data using two-dimensional tiles in a hot tier in a distributed time-series database including a scalable metadata index, according to some embodiments. As discussed above, the database 100 may include a hot storage tier such as tier 150A that stores recent data with high availability and low latency. In one embodiment, the hot tier 150A may include a set of storage resources 160A such as database clusters that include computational resources and memory resources. The database clusters may store time-series data using tiles that are generated or appended to by storage nodes 140. Tiles may be stored using storage resources such as memory (e.g., RAM) and/or solid-state drives for lower latency of storage and retrieval. Tiles may be replicated across different storage resources of clusters (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on schema-based clustering that seeks to co-locate related time series in the same partition, and the schema-based clustering may be performed by the ingestion routers 110. Tiles may also be partitioned along non-overlapping temporal boundaries. Due to the spatial dimension 301 and the temporal dimension 309, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ. In one embodiment, if the clustering scheme is changed, then subsequent tiles may be reorganized to reflect the clustering change over time.

In the example of FIG. 3, a set of time series may be routed to storage nodes 140A, 140B, and 140C based on a spatial range (e.g., using schema-based clustering). Particular partitions of time-series data may be mapped to particular storage nodes for writing data from the partitions to the hot tier 150A. For example, one partition may be assigned to storage node 140A that writes to the hot tier, another partition may be assigned to storage node 140B that writes to the hot tier, and yet another partition may be assigned to storage node 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the storage node for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 3, storage node 140A may write to an open tile 310A3 that was preceded in time by a tile 310A2 that was preceded in time by a now-expired tile 310A. Similarly, storage node 140B may write to an open tile 310B4 that was preceded in time by a tile 310B3 that was preceded in time by a tile 310B2 that was preceded in time by a now-expired tile 310B1. Additionally, storage node 140C may write to an open tile 310C2 that was preceded in time by a tile 310C1. As discussed above, the contents of a tile may be replicated (e.g., using three replicas) across different location or zones to achieve greater durability within the hot tier.

Figure 4:
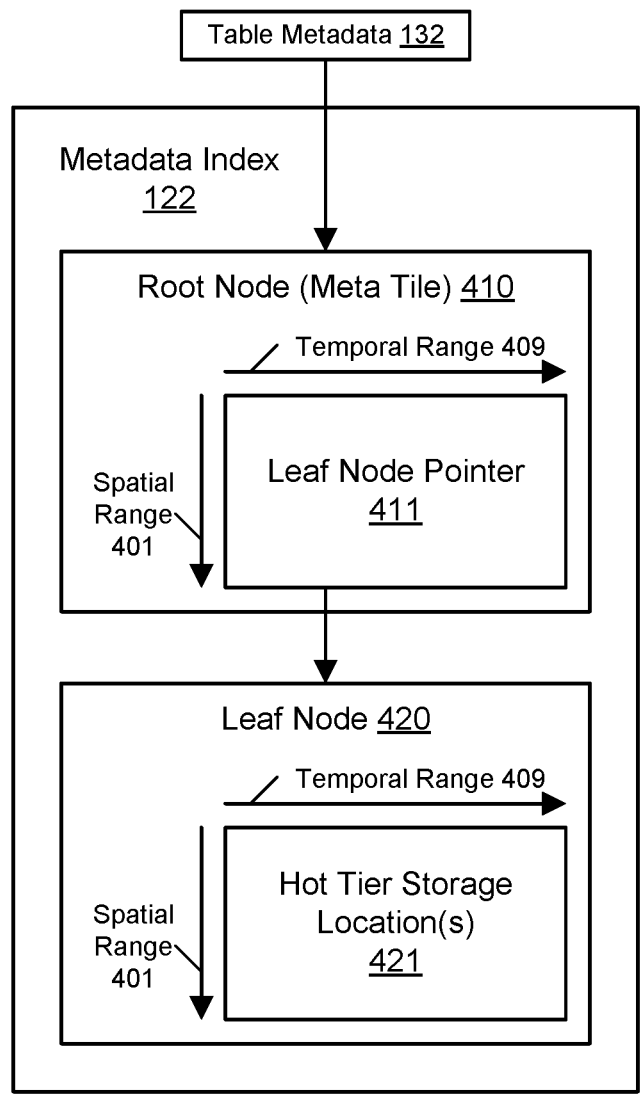
FIG. 4 illustrates an example of a scalable metadata index for a time-series database including a root node (meta tile) and a leaf node, according to some embodiments.

FIG. 4 illustrates an example of a scalable metadata index for a time-series database including a root node (meta tile) and a leaf node, according to some embodiments. The metadata index 122 may be implemented using a directed acyclic graph (DAG) or other tree-like data structure. In some embodiments, the metadata index 122 may use a two-dimensional B+ tree variant for storing time-series metadata. The graph may include nodes that are associated with particular spatial and temporal ranges of time-series data. The graph may include a root index node representing a high-level meta tile for a particular customer table. For example, the index 122 may include the root node 410 representing such a meta tile. The meta tile may represent the entire spatial range 401 and temporal range 409 of a particular table. The temporal range 409 may begin at a specific date and time and may extend to infinity or to a date and time in the far future. Customer table metadata 132 may include a pointer to the root node 410 for a given table. The graph may optionally include one or more intermediate index nodes that descend from the root node 410 or from other index nodes, each representing particular a portion of the spatial and temporal range of any parent index nodes such as the high-level meta tile 410. Below the index node(s), the graph may include a layer of leaf nodes that include pointers to location data for particular tiles in the underlying data store, where each leaf node represents a spatial and temporal range within the broader spatial and temporal range of a parent index node. For example, the index 122 may include a leaf node 420. The example shown in FIG. 4 may represent the state of an index 122 on creation of the table, where the table includes only one two-dimensional tile representing the entire spatial range 401 and temporal range 409 of the corresponding table.

In some embodiments, nodes may not include pointers to parent nodes, and the graph may be traversed in only one direction, e.g., starting with the root node 410. In some embodiments, a node (e.g., an index node or leaf node) may include a unique identifier usable to store the node in the data store 130, e.g., as a single row keyed by the unique identifier. In some embodiments, a node (e.g., an index node or leaf node) may include a bounding box for a spatial and temporal range represented by the sub-tree underneath the node. A bounding box may represent a rectangular representation of a set of spatial and temporal boundaries. An index node (representing a meta tile) may include one or more pointers to one or more other meta tiles or one or more leaf nodes. For example, root index node 410 may include a leaf node pointer 411 to the leaf node 420. An index node (representing a meta tile) may include one or more pairs of identifiers and bounding boxes of its child nodes.

A leaf node may include information about data sources at which time-series data is stored in one or more storage tiers 150A-150N. The data sources may include one or more database clusters in a "hot" storage tier 150A and/or one or more "buckets" of storage provided by a cloud-based storage service in a "cold" storage tier 150N. For example, the leaf node 420 may include information 421 indicating one or more storage locations in the hot tier 150A. In some embodiments, the actual storage location(s) may be stored in the data store 130, and the hot tier information 421 in the leaf node 420 may represent one or more references (e.g., one or more keys) to the storage location(s) as stored in the data store.

Figure 5A:
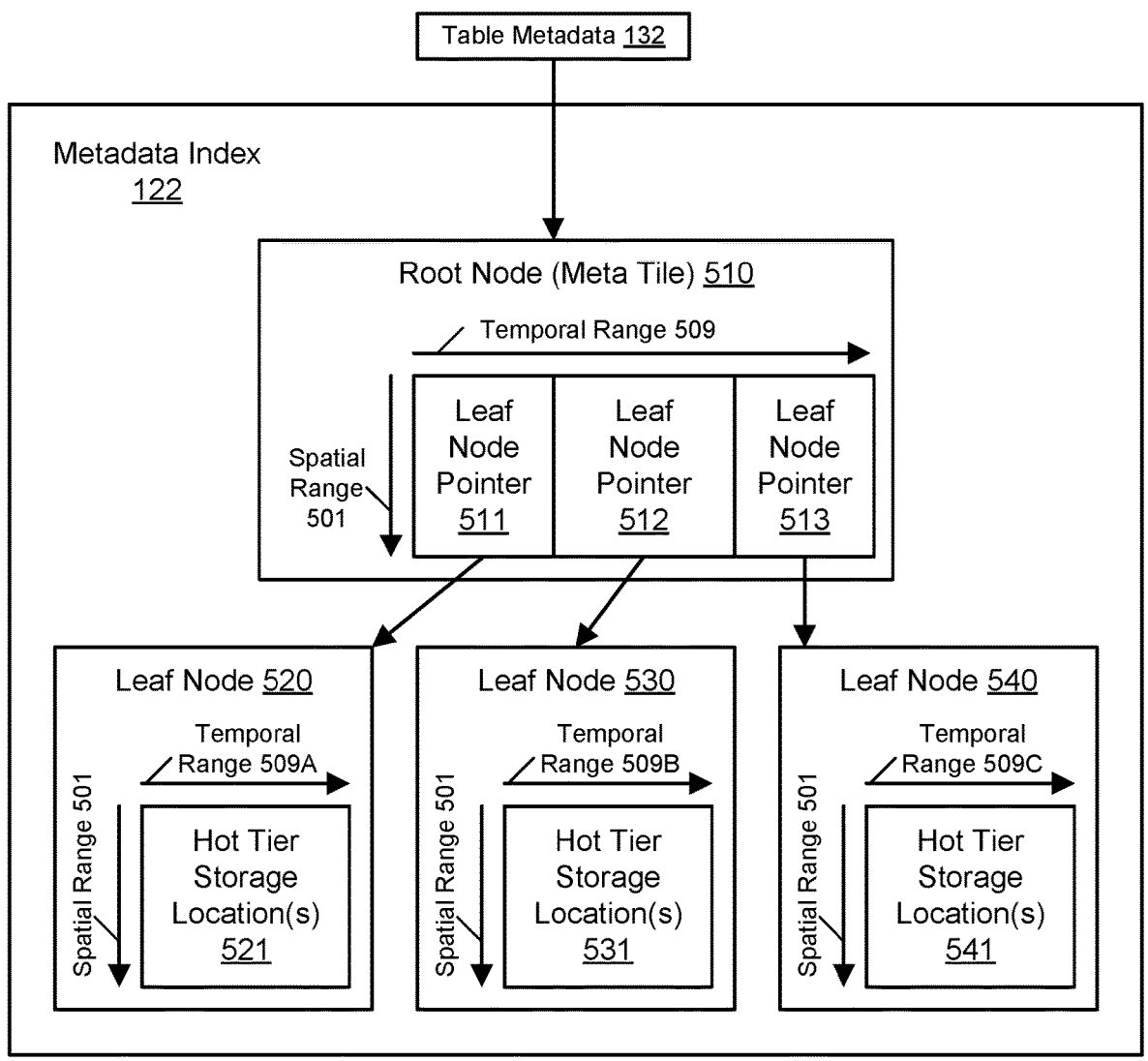
FIG. 5A illustrates an example of a metadata index resulting from one or more partition splits, according to some embodiments.

FIG. 5A illustrates an example of a metadata index resulting from one or more partition splits, according to some embodiments. When two-dimensional tiles in the time-series database 100 are repartitioned (e.g., split or merged), the index 122 may allow low-latency atomic updates. Splits may be initiated by storage nodes 140, and the metadata index 122 as well as the metadata in the data store 130 may be modified to reflect the changes. As shown in the example of FIG. 5A, the table represented by a root node 510 may have been subjected to one or more partition splits in the temporal dimension 509 but not necessarily in the spatial dimension 501. For example, an initial tile may have been split into two tiles representing different portions of the temporal range, and one of the new tiles may again have been split into two tiles representing different portions of the temporal range. Leaf nodes in the index 122 may represent individual tiles or other partitions in the database 100. As shown in the example of FIG. 5A, the root node 510 may now include a leaf node pointer 511 to a first leaf node 520, a leaf node pointer 512 to a second leaf node 530, and a leaf node pointer 513 to a third leaf node 520. The first leaf node 520 may represent the spatial range 501 and a first portion 509A of the temporal range 509, the second leaf node 530 may represent the spatial range 501 and a second portion 509B of the temporal range 509, and the third leaf node 540 may represent the spatial range 501 and a third portion 509C of the temporal range 509. The first leaf node 520 may include information 521 indicating or referencing one or more storage locations in the hot tier 150A, the second leaf node 530 may include information 531 indicating or referencing one or more storage locations in the hot tier 150A, and the third leaf node 530 may also include information 531 indicating or referencing one or more storage locations in the hot tier 150A.

In some embodiments, tiles resulting from a split may satisfy the same bounding box (spatial and temporal ranges) as the original tile with no gaps. To persist a partition split to the index 122, the meta tile(s) pointing to the tile to be split may be identified. This lookup may be performed using traversal of the index with a bounding box query as discussed below with respect to FIG. 6B. A single transaction in the data store 130 may be performed to create the new post-split tiles, replace the pointer in the meta tile with pointers to the post-split tiles, and mark the tile-to-be-split for deletion (e.g., using a time-to-live [TTL] functionality of the data store 130). In some embodiments, n-to-m repartitions may be performed such that some combination of splits and merges are carried out in sequence to turn n tiles into m tiles. The various splits and/or merges may be persisted to the metadata index 122 using a single modification rather than a set of individual modifications for each split or merge.

The time-series database 100 may performs splits of tiles such that data movement (e.g., from one database cluster to another) is minimized while high availability for writes and queries is maintained. A storage node 140A may include a component for tile heat analysis. The tile heat analysis may analyze metrics for the heat for individual tiles whose leases are held by the storage node 140A. The heat for a tile may represent the throughput of data written to the tile or some other usage metric or rate. If the heat for a particular tile exceeds a heat threshold (e.g., a particular throughput or other usage over the past N minutes), then the node 140A may decide to split the tile to maintain high availability for writes of newly ingested time-series data. A tile splitting component may implement the tile splitting in a manner that minimizes data movement from database cluster to database cluster. The tile may have temporal boundaries representing a particular temporal range and spatial boundaries representing a particular spatial range. In some embodiments, the temporal range may extend indefinitely into the future. As will be discussed below, the tile splitting may first perform a temporal split and then a spatial split to minimize data movement while maintaining high availability.

The original tile may be split temporally. The temporal split may result in an intermediate tile having the original spatial boundaries but a later portion of the original temporal boundaries. The tile may be considered temporary. No data may be written to the intermediate tile, and in some embodiments, no tile metadata may be created for the intermediate tile. The temporal split may also result in a tile having the original spatial boundaries but an earlier portion of the original temporal boundaries. The tile may represent a modified version of the original tile, e.g., by storing the tile and its contents in the original location but with modified tile metadata. The temporal split point may be selected at a time at or after the current time. The temporal split point may be selected at a time after the latest timestamp of any time-series data already written to the original tile. By generating the intermediate tile with temporal boundaries in the future, the corresponding data set may be empty at the time of the temporal split. The tile may remain in its current location in the database cluster such that none of its contents need to be moved. Additionally, the tile may continue to receive some time-series data, depending on when the temporal split point is selected. In some embodiments, the storage node 140A may acquire leases to the tile, but no lease need be acquired for intermediate tile because it is a temporary element. The tile splitting may include adding indirection pointers from the original tile to newly created tiles and from the newly created tiles to the original tile.

The intermediate tile may then be split spatially to generate two new tiles. The temporal split and spatial split may be performed as a two-stage but atomic operation such that no tile metadata is created for the intermediate and temporary tile. The first new tile may represent a first portion of the original spatial boundaries along with the same temporal boundaries as the intermediate tile. Similarly, the second new tile may represent a second portion of the original spatial boundaries along with the same temporal boundaries as the intermediate tile. The spatial range may be divided among the new tiles on any suitable basis, e.g., to divide the heat as evenly as possible. The spatial range of the first new tile may include a contiguous series of keys, and the spatial range of the second new tile may also include a contiguous series of keys. The respective spatial ranges of the new tiles may be non-overlapping. In some embodiments, the storage node 140A may acquire leases to the new tiles.

Figure 5B:
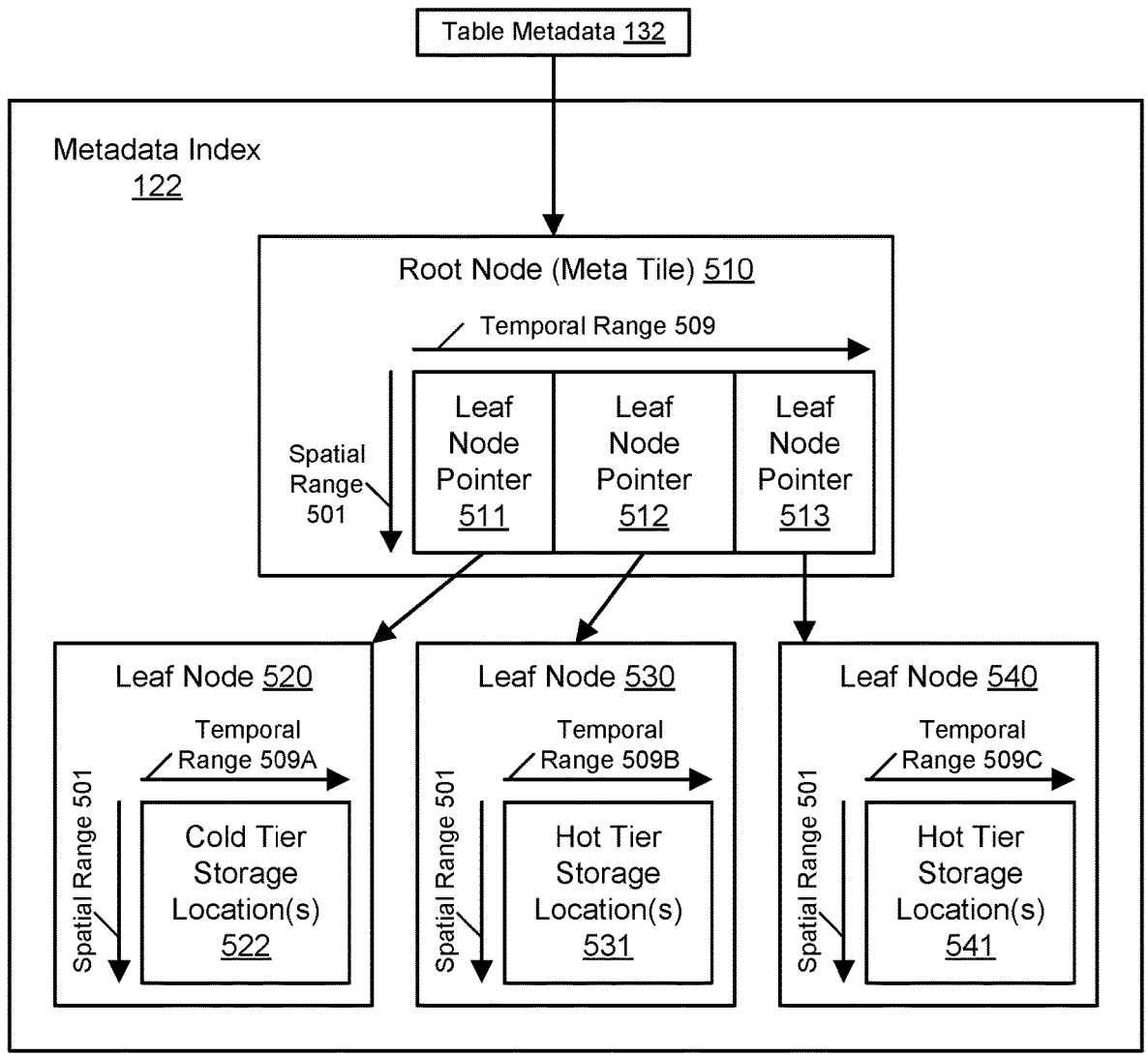
FIG. 5B illustrates an example of a metadata index referencing time-series data that has been moved from a hot tier to a cold tier, according to some embodiments.

FIG. 5B illustrates an example of a metadata index referencing time-series data that has been moved from a hot tier to a cold tier, according to some embodiments. As the data ages, time-series data may be moved (e.g., by the storage nodes 140) from the hot tier to a cold tier according to a retention policy. As shown in the example of FIG. 5B, to reflect this change, the leaf node 520 may be update to remove the hot tier information 521 and add information 522 indicating or referencing one or more storage locations in the cold tier 150N. In some embodiments, a given leaf node may include both hot tier information and cold tier information.

Figure 5C:
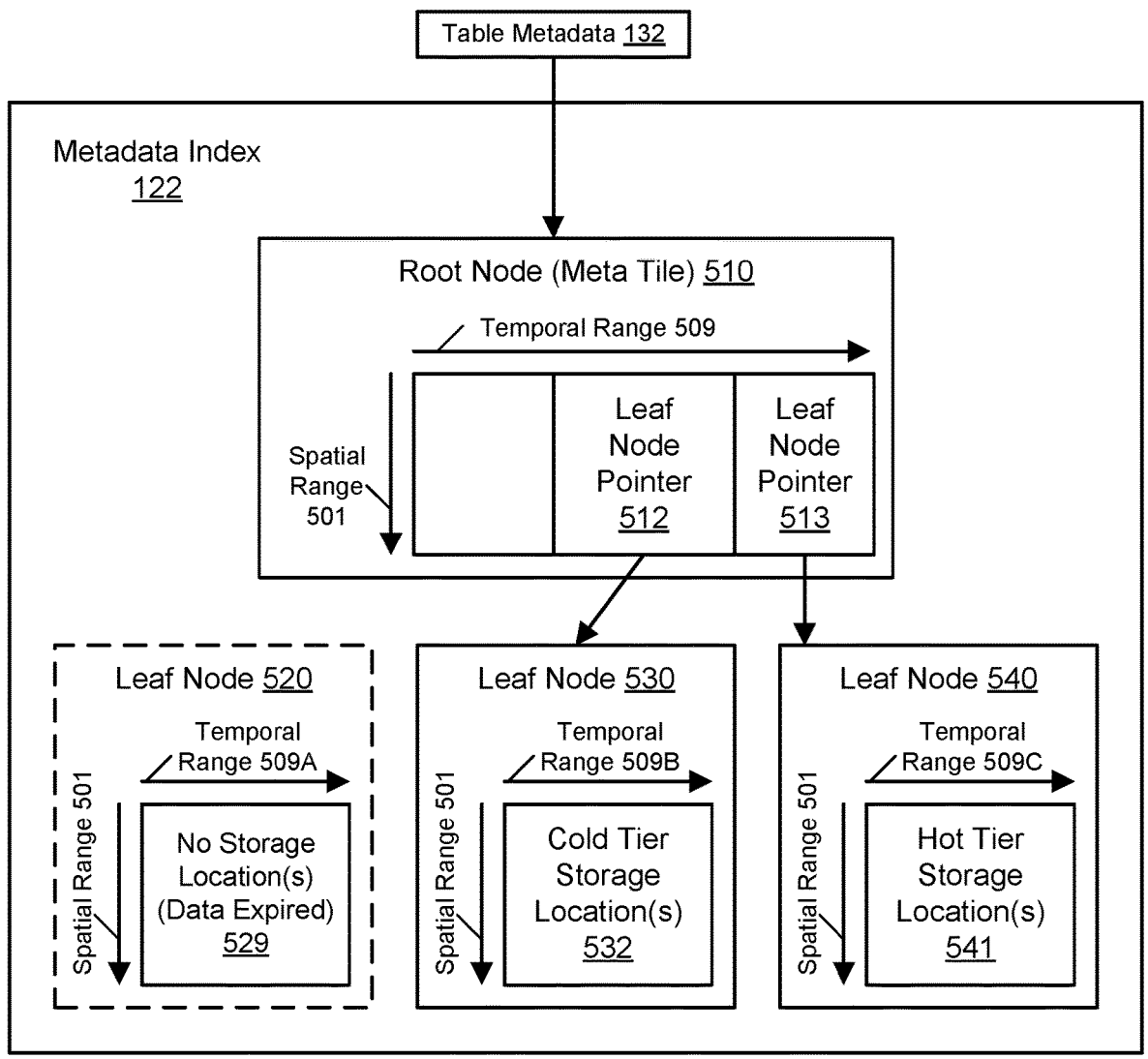
FIG. 5C illustrates an example of a metadata index referencing time-series data that has expired and been removed from the time-series database, according to some embodiments.

FIG. 5C illustrates an example of a metadata index referencing time-series data that has expired and been removed from the time-series database, according to some embodiments. When data sources are trimmed over time (e.g., due to expiration of data points according to a retention policy), corresponding nodes in the graph may also be removed. For example, at a later point in time reflected by the example of FIG. 5C, the data at the cold tier location(s) 532 may have expired and been removed from the database 100 altogether. Additionally, as more data is moved from the hot tier to the cold tier over time, the leaf node 530 may be updated to remove the hot tier information 531 and add information 532 indicating or referencing one or more storage locations in the cold tier 150N. As a result of the expiration and removal of data, the leaf node 520 may be updated to remove the cold tier information 532, leaving the node with no information 529 indicating or referencing storage locations of time-series data. When a leaf node contains no such information for any storage tier, the node may be removed from the metadata index 122. As shown in the example of FIG. 5C, the leaf node 520 may be removed along with the pointer 511 to that node. Similarly, when an index node includes no pointers to any child nodes (e.g., other index nodes or leaf nodes), that node may be removed from the metadata index 122.

Figure 6A:
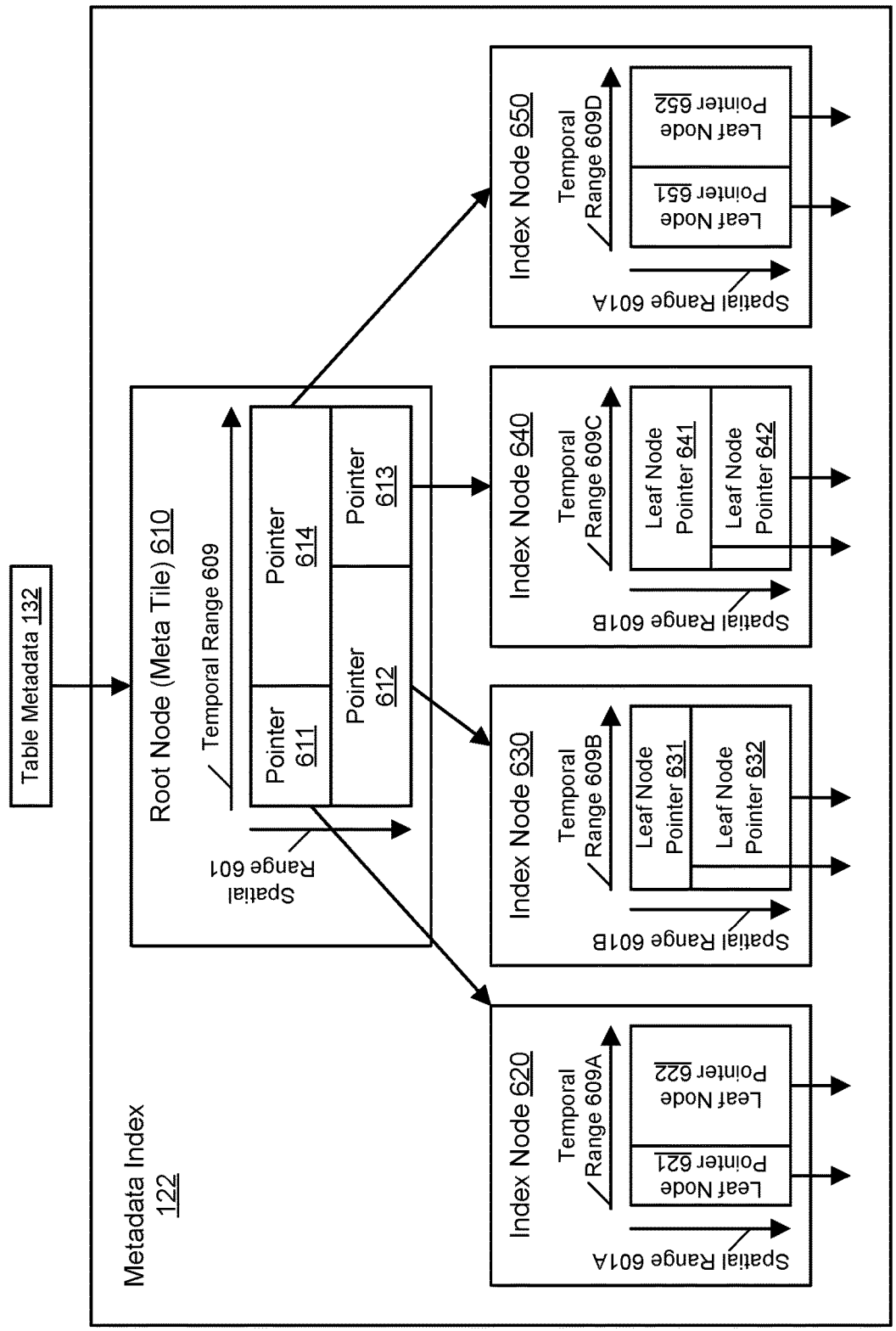
FIG. 6A illustrates an example of a metadata index including a root index node (meta tile) and an additional layer of index nodes (meta tiles), according to some embodiments.

FIG. 6A illustrates an example of a metadata index including a root index node (meta tile) and an additional layer of index nodes (meta tiles), according to some embodiments. As discussed above, an index node such as root node 610 may point to additional index nodes rather than leaf nodes. The additional index nodes may represent different portions of the spatial range 601 and temporal range 609 of the root node 610. For example, the root node 610 may include a pointer 611 to an index node 620 that represents a spatial range 601A and a temporal range 609A, a pointer 612 to an index node 630 that represents a spatial range 601B and a temporal range 609B, a pointer 613 to an index node 640 that represents the spatial range 601B and a temporal range 609C, and a pointer 614 to an index node 650 that represents the spatial range 601A and a temporal range 609D. The intermediate index nodes may also represent meta tiles because the index nodes do not contain the storage location information of leaf nodes. The intermediate index nodes may include pointers to other index nodes or, as shown in the example of FIG. 6A, to leaf nodes. For example, index node 620 may include leaf node pointers 621 and 622, index node 630 may include leaf node pointers 631 and 632, index node 640 may include leaf node pointers 641 and 642, and index node 650 may include leaf node pointers 651 and 652. Index nodes may vary in terms of the number of child nodes to which they point, e.g., from 1 to some maximum value. In some embodiments, an index node (including the root node) may be limited to a maximum number of pointers to child nodes (additional index nodes or leaf nodes), beyond which the index may be rebalanced to redistribute the pointers to index nodes at the next lowest level.

Figure 6B:
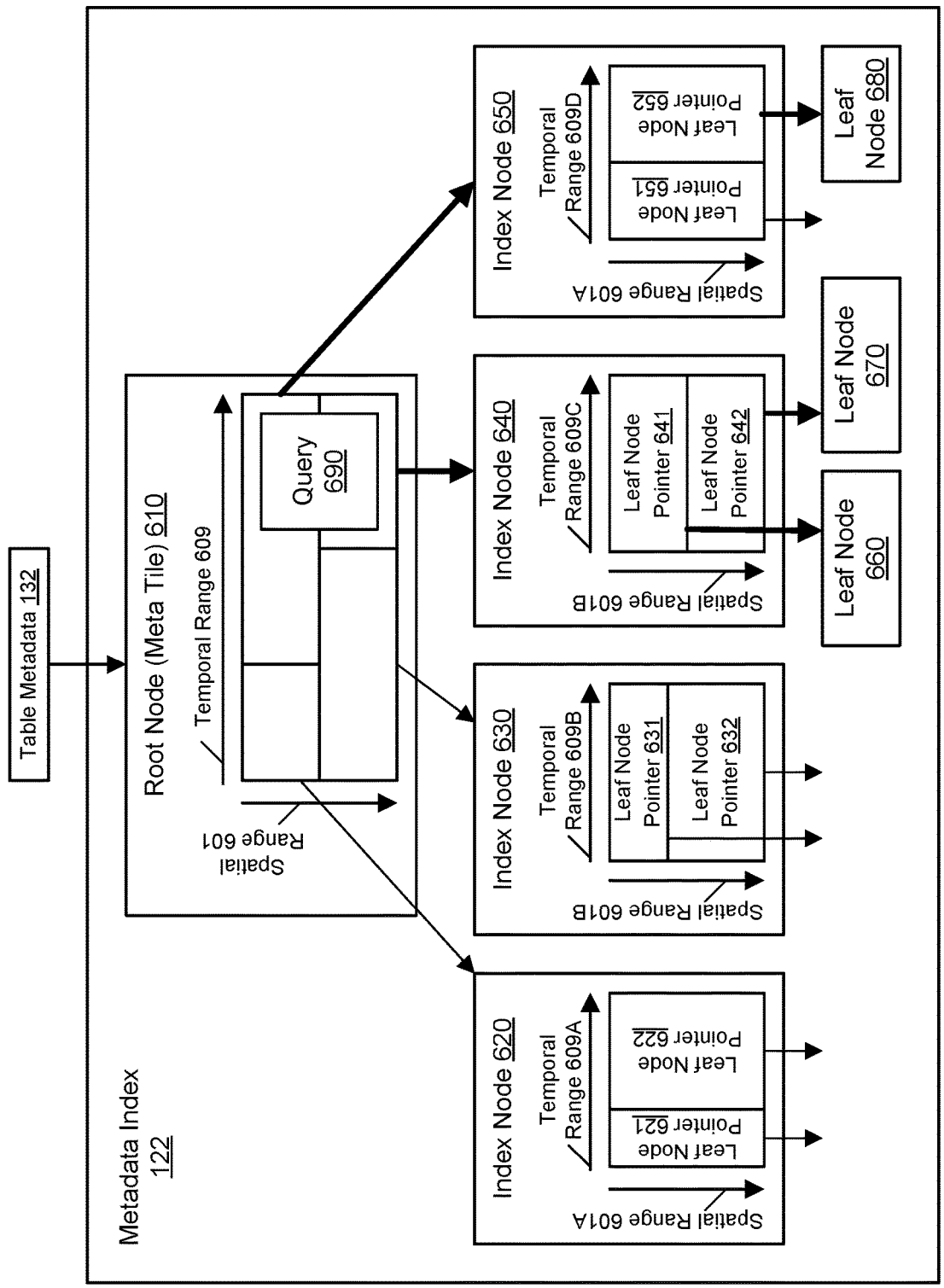
FIG. 6B illustrates an example of a query performed using a metadata index with a root index node (meta tile) and an additional layer of index nodes (meta tiles), according to some embodiments.

FIG. 6B illustrates an example of a query performed using a metadata index with a root index node (meta tile) and an additional layer of index nodes (meta tiles), according to some embodiments. In some embodiments, to enable efficient lookup for data sources in a query, the metadata index service 120 may prune metadata based on input space and time bounding boxes such that meta tiles do not overlap in terms of bounding boxes. As shown in the example of FIG. 6B, a query 690 may be submitted (e.g., using the query processor(s) 170) that represents a spatial range and/or temporal range. The bounding box of the query 690 with respect to the spatial range 601 and temporal range 609 of the meta tile 610 is illustrated in FIG. 6B. To identify leaf nodes that include storage location information relevant to the query, the index 122 may be traversed from the root node 610 while selecting paths whose spatial and temporal ranges are relevant to those of the query 690. In the example of FIG. 6B, traversal need not proceed to index node 620 or index node 630 because those nodes do not represent spatial and temporal ranges desired by the query 690. However, traversal may proceed to index node 640 because it represents spatial and temporal ranges sought by the query 690. For similar reasons, traversal may then proceed to the leaf node 660 referenced by pointer 641 and to the leaf node 670 referenced by pointer 642, and the storage location information may be retrieved using those leaf nodes to determine where to direct a relevant portion of the query 690 (e.g., to one or more database clusters storing tiles that correspond to leaf nodes 660 and 670). Similarly, traversal may proceed to index node 650 because it represents spatial and temporal ranges sought by the query 690. Traversal may then proceed to the leaf node 680 referenced by pointer 652 but not to the leaf node referenced by pointer 651, and the storage location information may be retrieved using the leaf node 680 to determine where to direct a relevant portion of the query 690 (e.g., to a database cluster storing a tile that corresponds to leaf node 680).

Figure 7A:
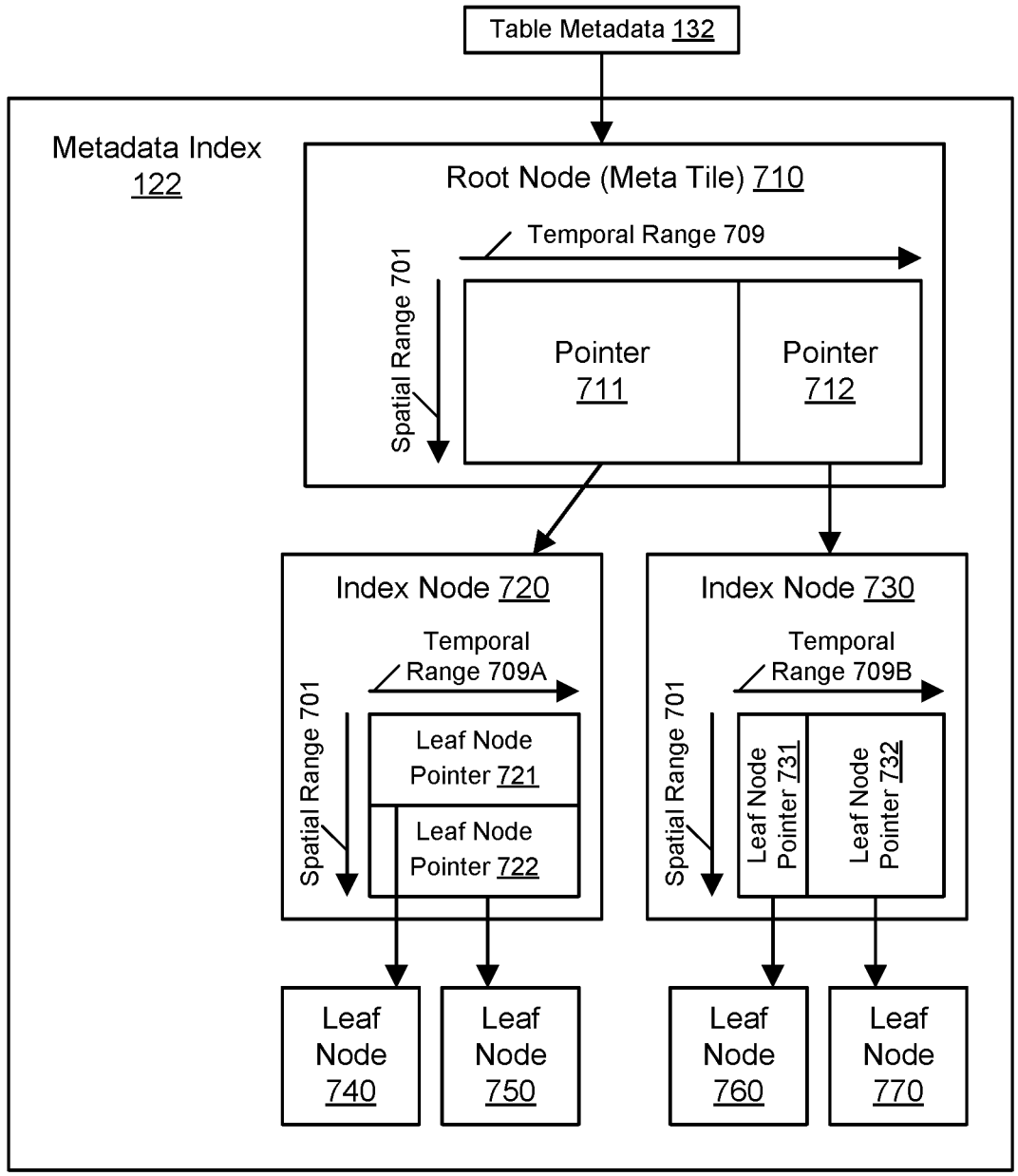
FIG. 7A, FIG. 7B, FIG. 7C, and FIG. 7D illustrate examples of a metadata index resulting from a series of partition merges, according to some embodiments.

FIG. 7A, FIG. 7B, FIG. 7C, and FIG. 7D illustrate examples of a metadata index resulting from a series of partition merges, according to some embodiments. When two-dimensional tiles in the time-series database 100 are repartitioned (e.g., split or merged), the graph may allow low-latency atomic updates. Merges may be initiated by storage nodes 140, and the metadata index 122 as well as the metadata in the data store 130 may be modified to reflect the changes. FIG. 7A represents a state of a metadata index 122 prior to any merges. A root node 710 may point to additional index nodes 720 and 730. The additional index nodes 720 and 730 may represent different portions of the spatial range 701 and temporal range 709 of the root node 710.

For example, the root node 710 may include a pointer 711 to an index node 720 that represents the spatial range 701 and a temporal range 709A and a pointer 712 to an index node 730 that represents the spatial range 701 and a temporal range 709B. The intermediate index nodes 720 and 730 may also represent meta tiles because the index nodes do not contain the storage location information of leaf nodes. The intermediate index nodes may include pointers to other index nodes or, as shown in the example of FIG. 7A, to leaf nodes. For example, index node 720 may include leaf node pointer 721 to leaf node 740 and leaf pointer 722 to leaf node 750, and index node 730 may include leaf node pointer 731 to leaf node 760 and leaf pointer 732 to leaf node 770.

Figure 7B:
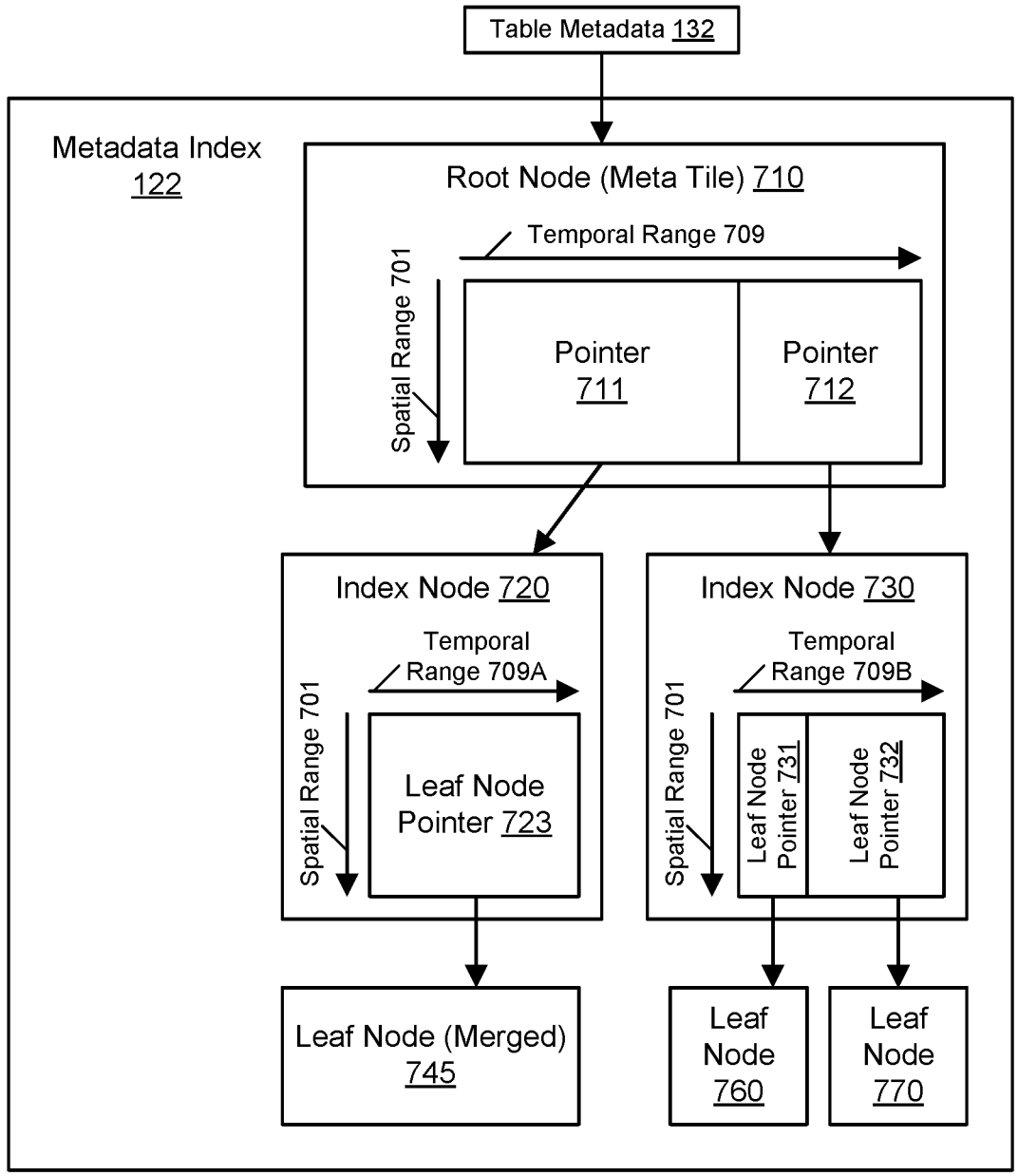

As shown in the example of FIG. 7B, the tiles corresponding to leaf nodes 740 and 750 may be merged into a single tile. As a result, the metadata index 122 may be modified to replace the leaf nodes 740 and 750 with a leaf node 745 representing the merged tile having the spatial range 701 and temporal range 709A. The index node 720 may be modified to include a leaf node pointer 723 to the merged leaf node 745.

Figure 7C:
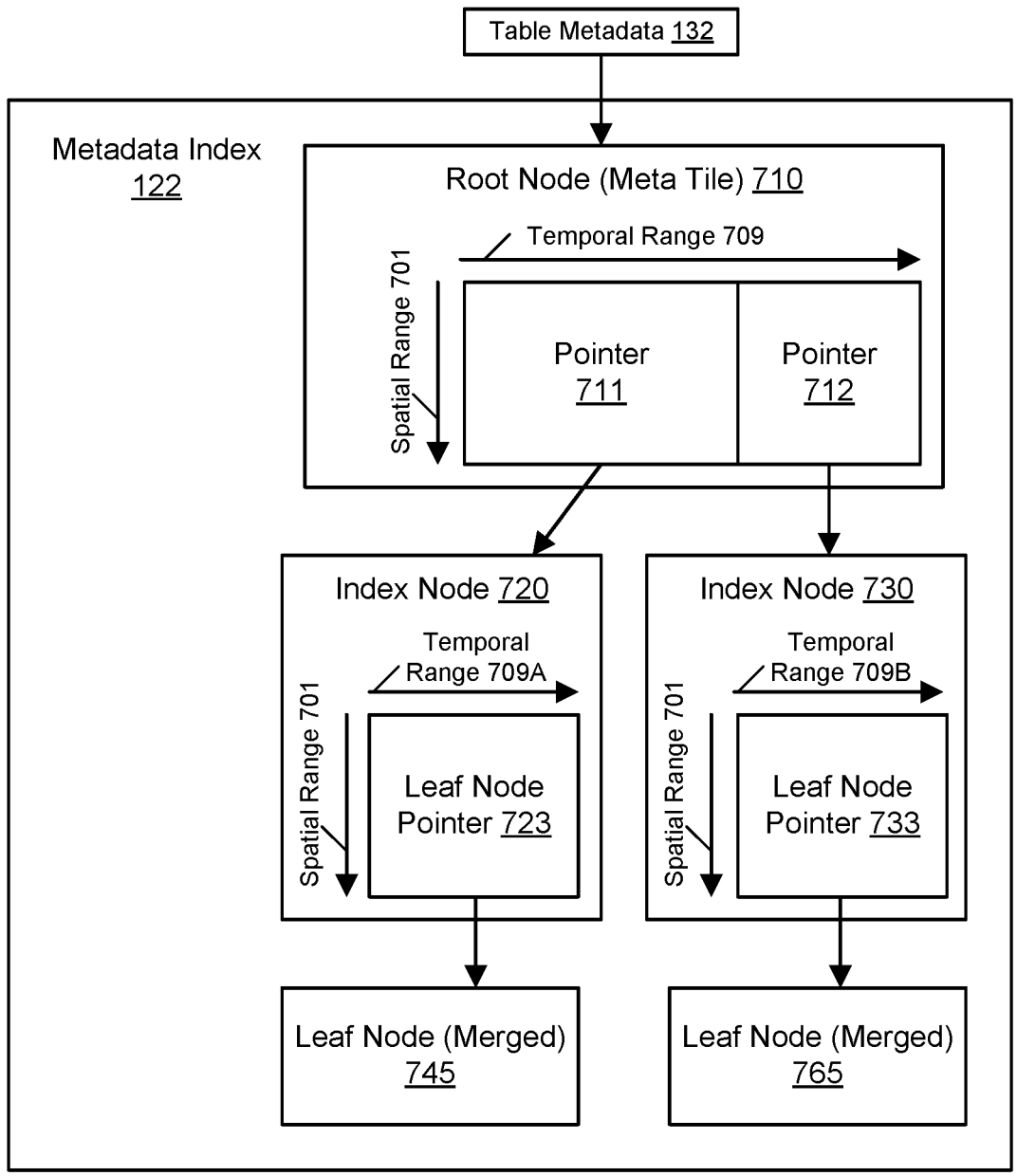

As shown in the example of FIG. 7C, the tiles corresponding to leaf nodes 760 and 770 may be merged into a single tile. As a result, the metadata index 122 may be modified to replace the leaf nodes 760 and 770 with a leaf node 765 representing the merged tile having the spatial range 701 and temporal range 709B. The index node 730 may be modified to include a leaf node pointer 733 to the merged leaf node 765.

Figure 7D:
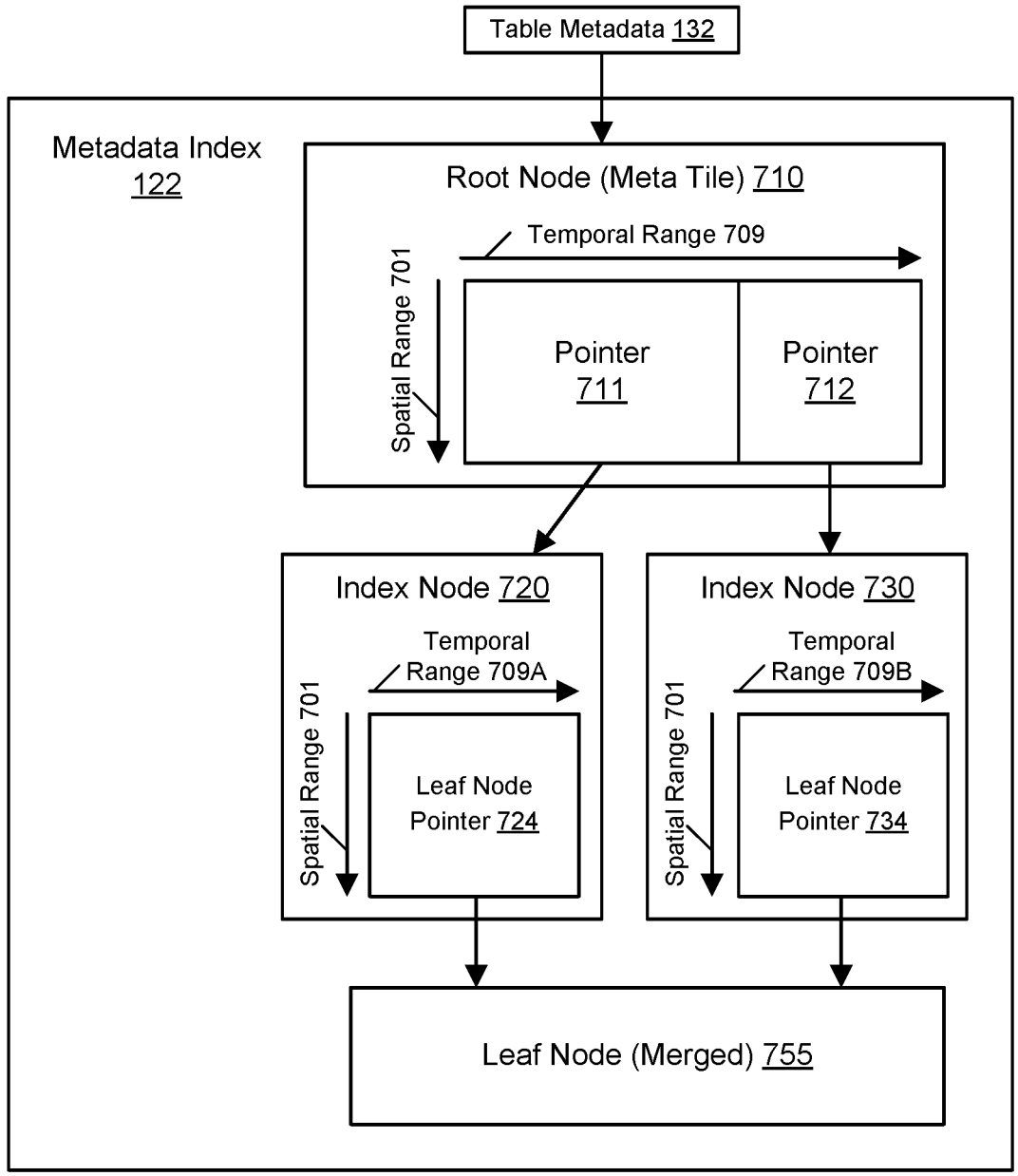

As shown in the example of FIG. 7D, the tiles corresponding to leaf nodes 745 and 765 may be merged into a single tile. As a result, the metadata index 122 may be modified to replace the leaf nodes 745 and 765 with a leaf node 565 representing the merged tile having the spatial range 701 and temporal ranges 709A and 709B. The index node 720 may be modified to include a leaf node pointer 724 to the merged leaf node 755, and the index node 730 may be modified to include a leaf node pointer 734 to the merged leaf node 755. Thus two index nodes may point to the same leaf node in some circumstances, e.g., following one or more partition merge operations. Traversal of the index 122 via either the index node 720 or the index node 730 may reach the same leaf node 755.

In some embodiments, tiles resulting from a merge may form the same bounding box (spatial and temporal ranges) as the original tiles with no gaps. To persist a partition merge to the index 122, the meta tile(s) pointing to the tiles to be merged may be identified. This lookup may be performed using traversal of the index with a bounding box query as discussed above with respect to FIG. 6B. A single transaction in the data store 130 may be performed to create the new post-merge tile, replace the pointers in one or more meta tiles with a pointer to the post-merge tile, and mark the tiles-to-be-merged for deletion (e.g., using a time-to-live [TTL] functionality of the data store 130).

Figure 8A:
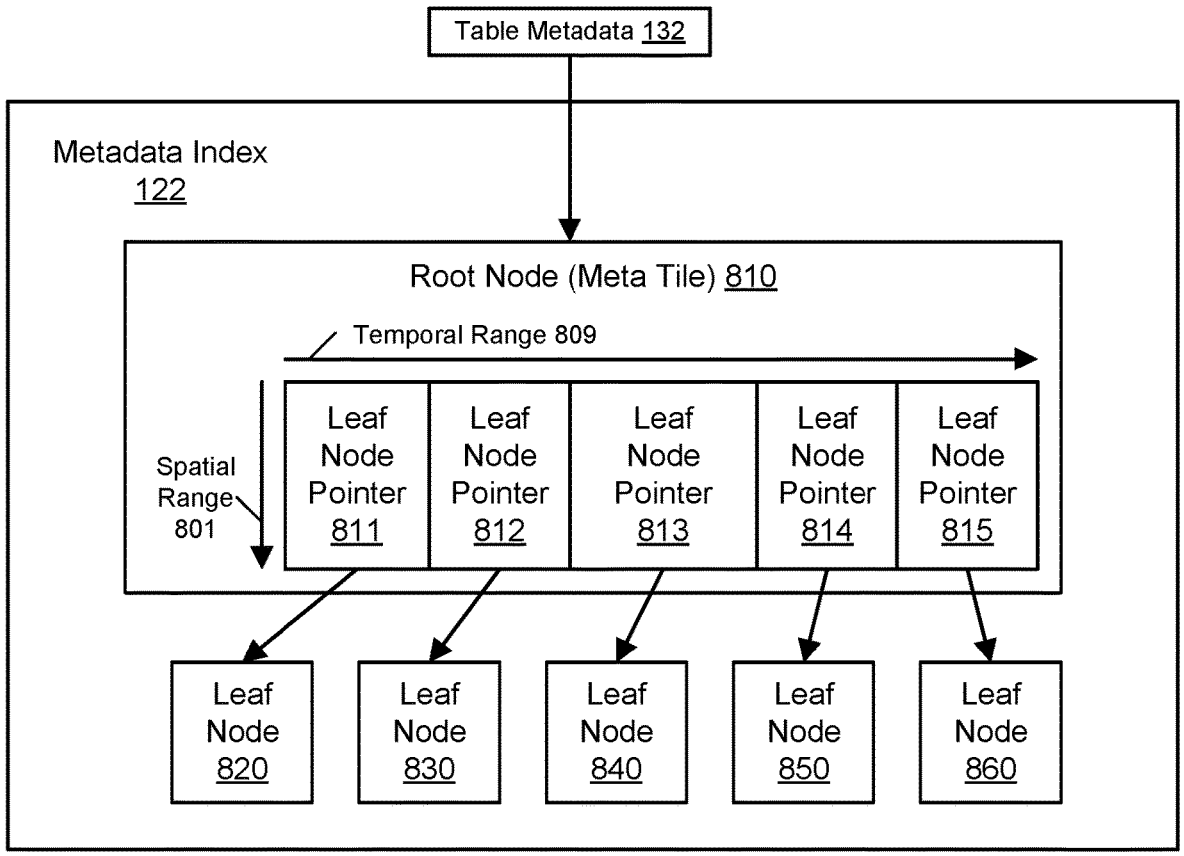
FIG. 8A, FIG. 8B, FIG. 8C, and FIG. 8D illustrate examples of a metadata index in which balancing is performed for index nodes (meta tiles), according to some embodiments.
Figure 8B:
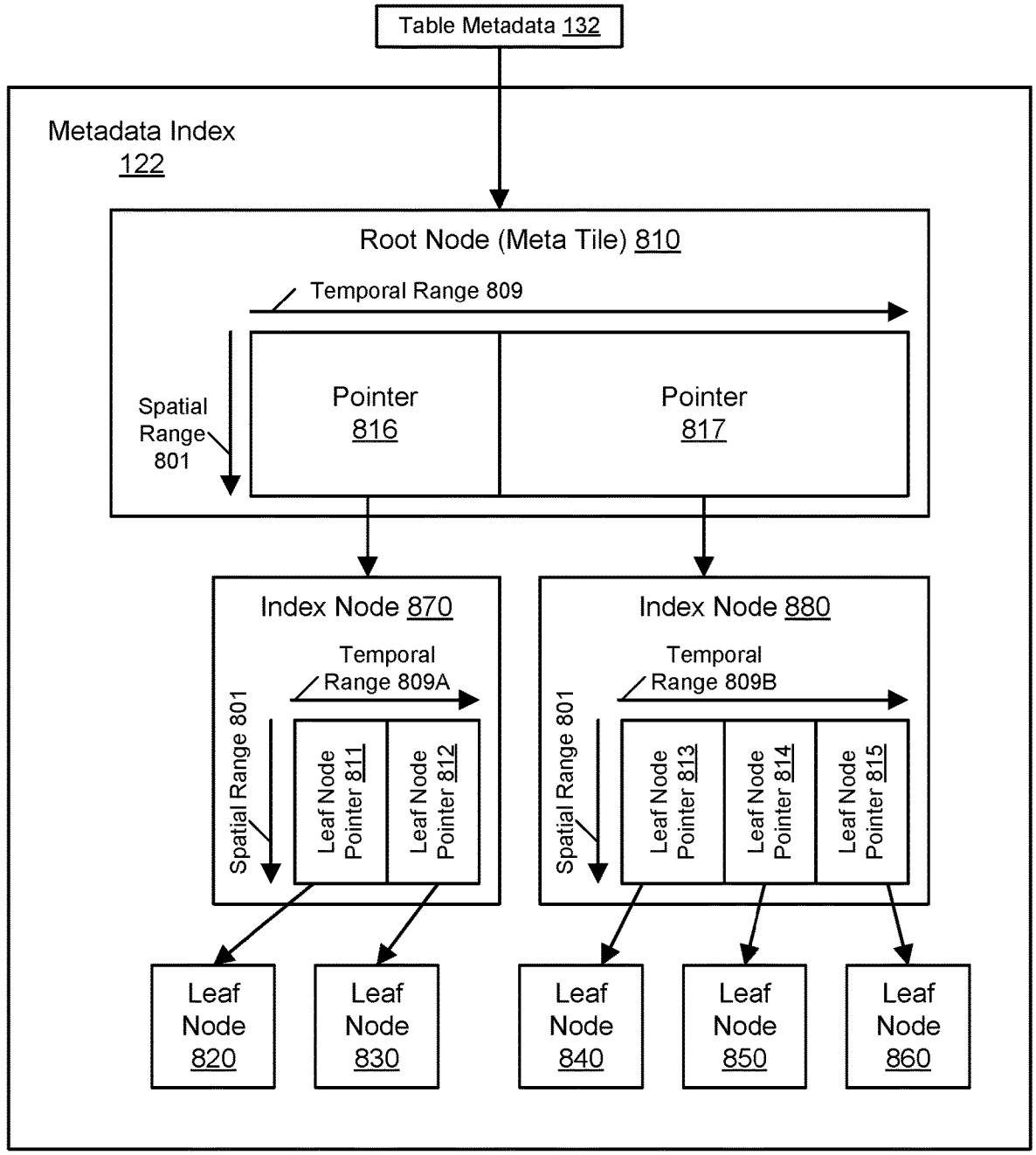

FIG. 8A and FIG. 8B illustrate examples of a metadata index in which balancing is performed for index nodes (meta tiles), according to some embodiments. In some embodiments, the graph representation may be kept balanced by bounding the depth and thereby providing an upper bound for single data point lookup latencies. In some embodiments, an index node (including the root node) may be limited to a maximum number of pointers to child nodes (additional index nodes or leaf nodes), beyond which the index may be rebalanced to redistribute the pointers among index nodes at the next lowest level. The graph may grow from the root node, and an index node lacking capacity for additional child node references may leverage its parent node to rebalance its child references across multiple index nodes. The size of a meta tile may be capped to avoid creating hotspots in the data store 130 where a single key fetch may exhaust the underlying partition tokens.

FIG. 8A represents a state of a metadata index 122 in which an index node has exceeded the maximum number of child references. For example, the maximum number of child references per index node may be four, and the root node 810 may point to five leaf nodes, e.g., as a result of one or more partition splits. The root node 810 may represent a spatial range 801 and a temporal range 809. The root node 810 may include a pointer 811 to a leaf node 820, a pointer 812 to a leaf node 830, a pointer 813 to a leaf node 840, a pointer 814 to a leaf node 850, and a pointer 815 to a leaf node 860. The index 122 may be rebalanced to redistribute the pointers 811, 812, 813, 814, and 815. In some embodiments, the rebalancing may be performed upon traversal of the index 122 for the first time after the maximum number of child references has been exceeded.

FIG. 8B represents a state of a metadata index 122 which has been rebalanced after an index node has exceeded the maximum number of child references. The child references 811, 812, 813, 814, and 815 may be redistributed among an additional layer of index nodes descending from the root node 810. The new layer of index nodes may include an index node 870 and an index node 880. The root node 810 may be modified to remove the child references 811, 812, 813, 814, and 815 and add a pointer 816 to the index node 870 and a pointer 817 to the index node 880. The new index node 870 may include the leaf node pointers 811 and 812 and may represent the spatial range 801 and a first portion 809A of the temporal range 809. The new index node 880 may include the leaf node pointers 813, 814, and 815 and may represent the spatial range 801 and a second portion 809B of the temporal range 809.

To perform a rebalancing of the index 122 when an intermediate index node has exceeded the maximum number of child pointers, the parent meta tile of the meta tile to be split may be identified. This lookup may be performed using traversal of the index with a bounding box query as discussed above with respect to FIG. 6B. The parent node may then be used to identify sibling index nodes of the node to be split, and child pointers may be redistributed among the sibling index nodes (including the node to be split). In some embodiments, a new sibling index node may be created, e.g., if the parent does not exceed the maximum number of child pointers. If the parent node also exceeds the maximum number of child pointers, then the parent's parent node may be identified for rebalancing. In some embodiments, the root node may not be split, but its child pointers may be assigned to the next layer of index nodes. A single transaction in the data store 130 may be performed to create the new meta tiles (each with a different portion of the child pointers), replace the pointers in the parent meta tile with pointers to the new meta tiles, and mark the meta-tile-to-be-split for deletion (e.g., using a time-to-live [TTL] functionality of the data store 130).

Figure 8C:
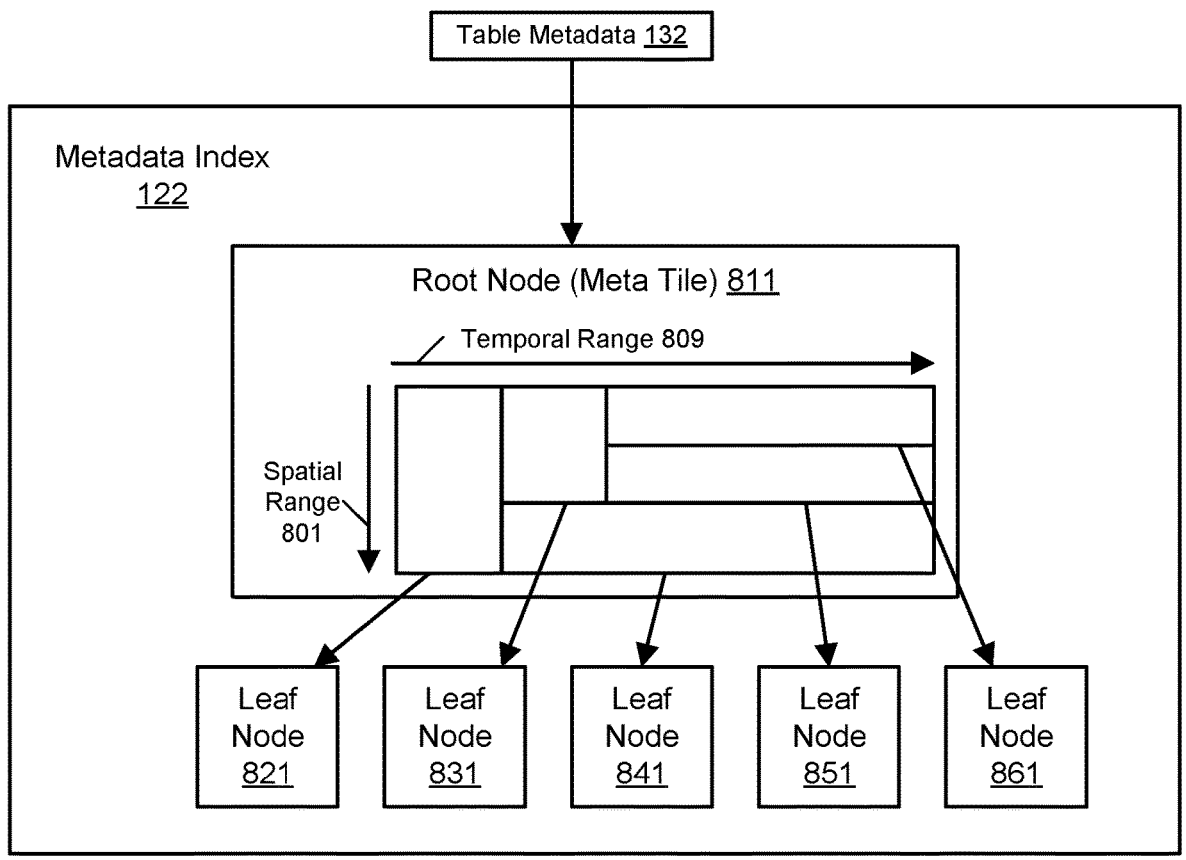

FIG. 8C represents a state of a metadata index 122 in which an index node has exceeded the maximum number of child references. In the example of FIG. 8C, a root node 811 has five child pointers for five leaf nodes 821, 831, 841, 851, and 861, and the maximum number of child pointers may be four. The index 122 may be balanced to minimize the tree traversal latency (e.g., proportional to depth). To split a meta tile 811 having child pointers, a spatial or temporal cut may be identified for the split, e.g., using a minimum overlap heuristic. In some embodiments, the cut should permit the two resulting halves to have a minimum difference of pointer counts with respect to a median value. To perform rebalancing, a set of n child pointers may be divided into two sets such that both sets represent a valid bounding box (rectangle) and the tree depth is kept bounded. In some embodiments, meta tiles associated with index nodes may always represent rectangular boundaries in space and time.

Figure 8D:
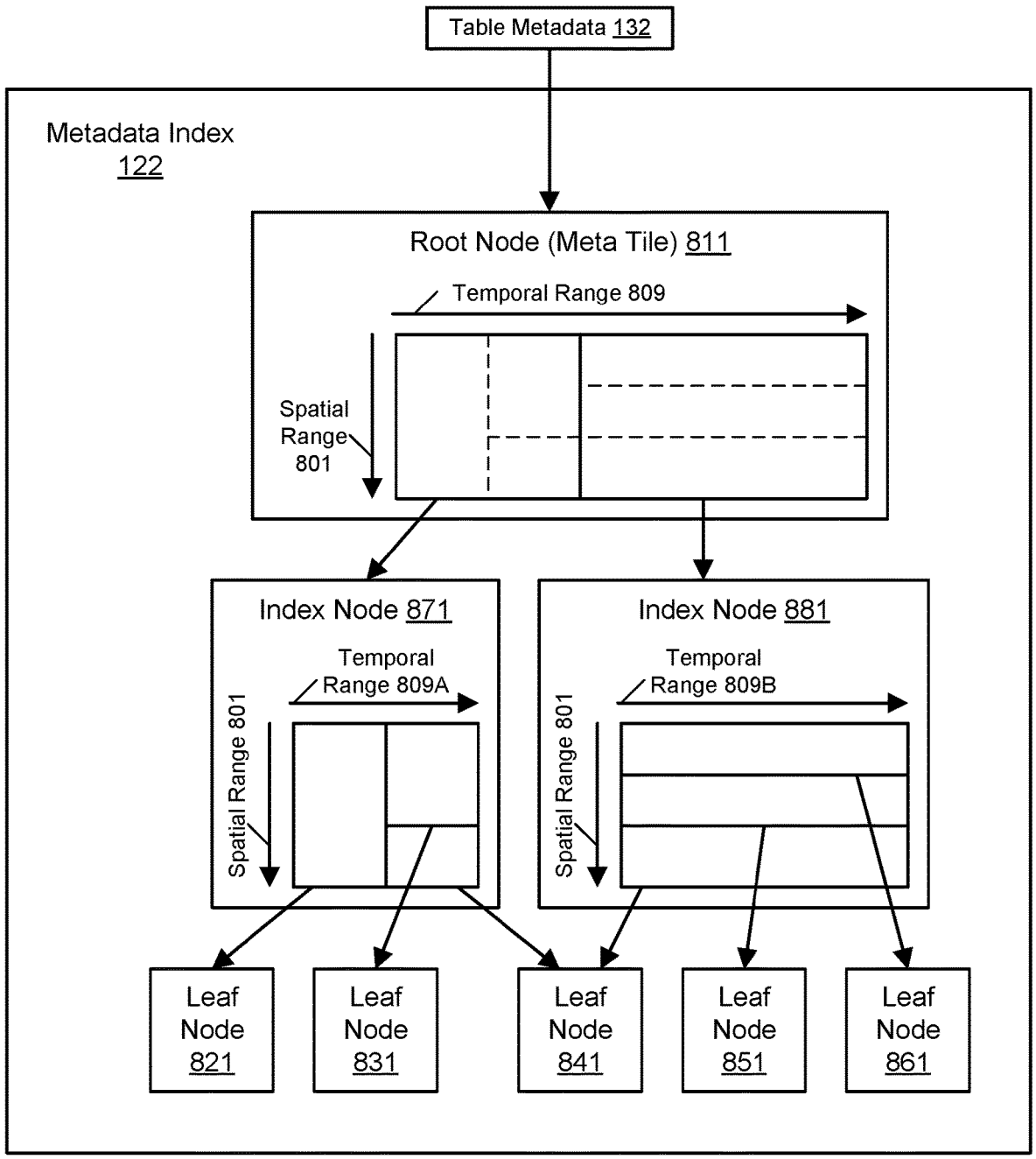

As shown in the example post-split state of FIG. 8D, the child pointers for leaf nodes 821, 831, 841, 851, and 861 may be redistributed among a first index node 871 (representing the original spatial range 801 and a first portion 809A of the original temporal range 809) and a second index node 881 (representing the original spatial range 801 and a second portion 809B of the original temporal range 809). Ideally then pointers may be divided into two sets of n/2 and n/2 bounding boxes each such that a given number of tiles can be stored in a B+ tree with a minimum number of nodes. However, an n/2 split may not always be possible because the split may require two valid bounding boxes as a result. Therefore, some tiles may be shared across the two bounding boxes after the split. To minimize sharing, the cut between the two sets of pointers may be determined use a quadratic function which penalizes the split point having shared tiles so that the minimal deviation wins. In some embodiments, the set of n child pointers may be split into meta tiles B and C such that $|n/2-\text{count}(B)|^2+|n/2-\text{count}(C)|^2$ is the minimum possible value, where 'count' is the number of child pointers for a tile. For example, as shown in FIG. 8D, the split may result in leaf node 841 being shared by two new index nodes 871 and 881. Because the index 122 represents a directed acyclic graph, two intermediate index nodes may point to the same child node (e.g., a leaf node), and a given leaf node may be reachable by traversing the graph via two or more different paths.

Figure 9:
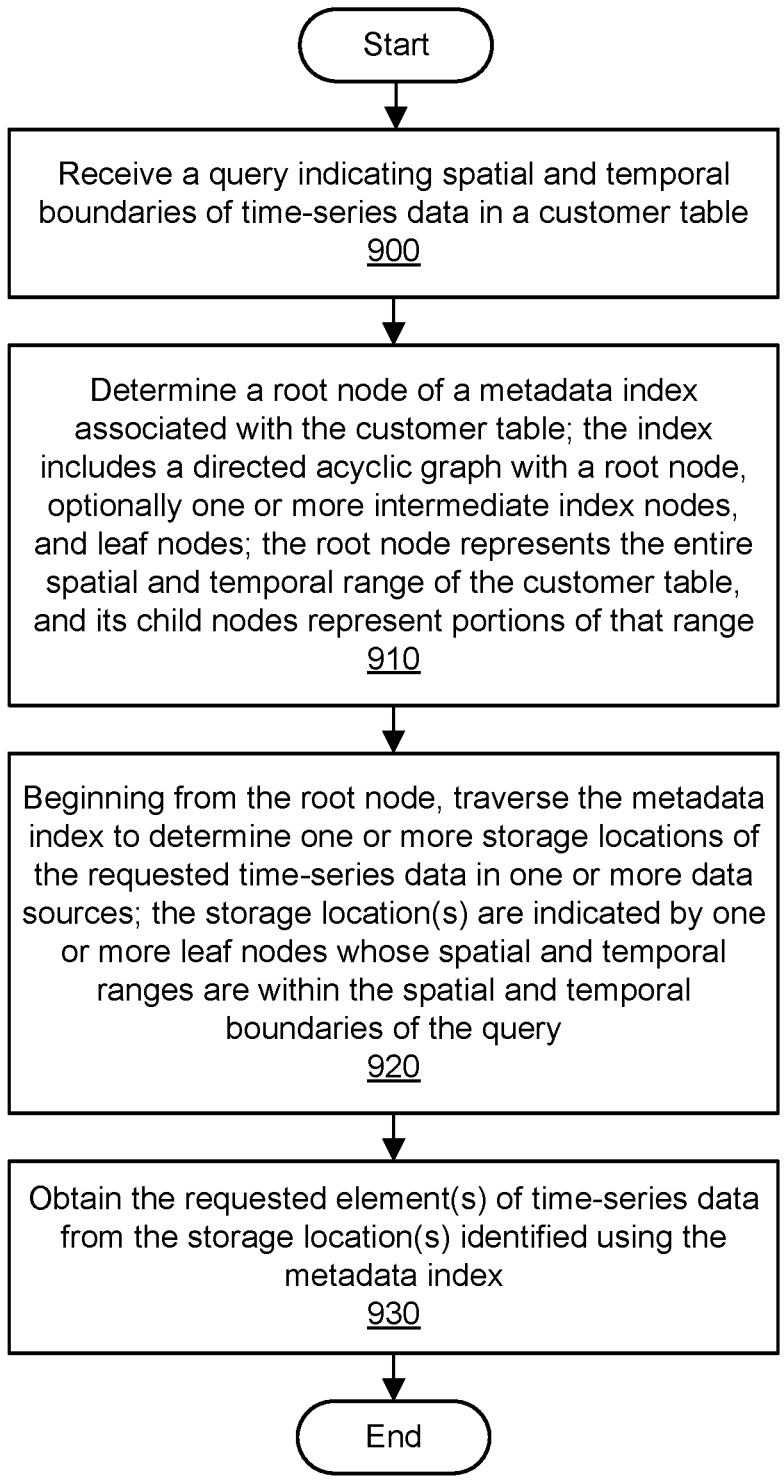
FIG. 9 is a flowchart illustrating a method for using a scalable metadata index for a time-series database, according to some embodiments.

FIG. 9 is a flowchart illustrating a method for using a scalable metadata index for a time-series database, according to some embodiments. As shown in 900, a query may be received by a query processor of a time-series database, e.g., based on user input via a user interface or input via a programmatic interface. The query may include or indicate spatial and temporal boundaries of requested time-series data in a particular customer table. For example, the spatial boundaries may include one or more specific values for keys or a range of values for keys. The temporal boundaries may include a starting time and an ending time.

As shown in 910, a root node of a metadata index corresponding to the customer table may be determined. The metadata index may be maintained by a metadata index service that authoritatively, consistently, and durably stores the locations and metadata of time-series data. In some embodiments, the root node may be determined using customer table metadata stored in a data store. The metadata index may include a directed acyclic graph with nodes at two or more levels of depth. The nodes may include a root node that represents the entire spatial and temporal range of the table. The nodes may optionally include additional intermediate (non-leaf) nodes, each representing a portion of spatial and temporal range of its parent node (e.g., the root node). The nodes may include one or more leaf nodes descending from index nodes (e.g., the root node or the intermediate index nodes). The leaf nodes may include or indicate storage locations of time-series data in one or more data sources (e.g., database clusters). A leaf node may represent a portion of the spatial and temporal range of its parent node (e.g., the root node). A leaf node may correspond to a two-dimensional tile in the time-series database. The non-leaf nodes may point to child nodes (e.g., other index nodes or leaf nodes) but may not include or indicate storage locations of time-series data in one or more data sources.

As shown in 920, the metadata index may be traversed, beginning from the root node, to determine one or more storage locations of the requested time-series data in one or more data sources. Traversal may include selecting paths (e.g., pointers to index nodes or leaf nodes) whose spatial and temporal boundaries overlap with the spatial and temporal boundaries of the query. As a result of the traversal, one or more of the leaf nodes may be reached or selected, and one or more other leaf nodes may not be reached or selected. The selected leaf nodes may correspond to tiles whose spatial and temporal boundaries overlap with the spatial and temporal boundaries of the query. The selected leaf nodes may include or indicate storage locations of time-series data desired by the query in one or more data sources (e.g., database clusters).

As shown in 930, one or more elements of time-series data relevant to the query may be obtained or retrieved from the storage location(s) identified using the metadata index. To maintain high availability and high throughput for queries of time-series data, the time-series database may use the metadata index service to identify the locations to which queries for particular time and space ranges are routed. In some embodiments, the metadata index may be traversed in a similar manner as part of the ingestion of newly received elements of time-series data. The ingested data may be routed to the storage location(s) determined by the index traversal for storage, e.g., in the hot tier.

Illustrative Computer System

In at least some embodiments, a computer system that implements a portion or all of one or more of the technologies described herein may include a computer system that includes or is configured to access one or more computer-readable media. FIG. 10 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 10 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a distributed time-series database comprising a query processor and one or more data sources, wherein the distributed time-series database stores time-series data of a plurality of time series using the one or more data sources, and wherein the distributed time-series database comprises one or more processors and one or more memories to store computer-executable instructions that, when executed, cause the one or more processors to:
receive, by the query processor, a query comprising spatial and temporal boundaries of requested time-series data in a customer table;
traverse a metadata index to determine one or more storage locations in the one or more data sources, wherein the metadata index comprises an index of metadata for determining one or more storage location in the one or more data stores, wherein the one or more storage locations correspond to the spatial and temporal boundaries, wherein the metadata index represents a directed acyclic graph comprising a plurality of nodes, wherein the metadata index includes a root node representing spatial and temporal boundaries of the customer table, wherein the metadata index includes one or more leaf nodes underneath the root node representing the spatial and temporal boundaries of the requested time-series data, wherein the metadata index includes one or more additional leaf nodes underneath the root node representing additional spatial and temporal boundaries of time-series data, wherein traversing the metadata index selects the one or more leaf nodes based at least in part on the spatial and temporal boundaries of the query, and wherein the one or more leaf nodes indicate the one or more storage locations in the one or more data sources; and
obtain, by the query processor, one or more elements of the requested time-series data from the one or more storage locations in the one or more data sources.

2. The system as recited in claim 1, wherein the one or more memories store additional computer-executable instructions that, when executed, cause the processors to:
receive an element of time-series data within additional spatial and temporal boundaries;
determine, using the metadata index, an additional storage location in the one or more data sources, wherein the metadata index includes an additional leaf node underneath the root node and representing the additional spatial and temporal boundaries, and wherein the additional leaf node indicates the additional storage location in the one or more data sources; and
store the element of time-series data in the additional storage location in the one or more data sources.

3. The system as recited in claim 1, wherein the one or more memories store additional computer-executable instructions that, when executed, cause the processors to:
determine that a quantity of pointers to child nodes in the root node of the metadata index has exceeded a threshold value;
add a second index node to the metadata index, wherein the second index node comprises a first portion of the pointers to the child nodes;
add a third index node to the metadata index, wherein the third index node comprises a second portion of the pointers to the child nodes; and
modify the root node to point to the second index node and the third index node instead of the child nodes.

4. The system as recited in claim 1, wherein the one or more memories store additional computer-executable instructions that, when executed, cause the processors to:
determine that one or more elements of time-series data have been removed from the distributed time-series database;
modify an additional leaf node corresponding to the one or more elements of time-series data to delete one or more references to the one or more elements of time-series data; and
if the additional leaf node comprises no references to elements of time-series data, remove the additional leaf node from the metadata index.

5. A method, comprising:
receiving, by a distributed time-series database, a query comprising spatial and temporal boundaries of requested time-series data in a table;
determining, by the distributed time-series database using a metadata index, one or more storage locations in one or more data sources using traversal of the metadata index, wherein the metadata index comprises an index of metadata for determining one or more storage location in the one or more data stores, wherein the metadata index includes a root node representing spatial and temporal boundaries of the table, wherein the metadata index includes one or more leaf nodes representing the spatial and temporal boundaries of the requested time-series data, wherein the traversal comprises selection of one or more paths through the metadata index based at least in part on the spatial and temporal boundaries of the requested time-series data, and wherein the one or more leaf nodes indicate the one or more storage locations in the one or more data sources; and
obtaining, by the distributed time-series database, one or more elements of the requested time-series data from the one or more storage locations in the one or more data sources.

6. The method as recited in claim 5, wherein determining the one or more storage locations comprises:
determining the root node based at least in part on an identifier of the table;
traversing the metadata index beginning from the root node, wherein the root node comprises a plurality of pointers to a plurality of leaf nodes, wherein the root node indicates respective spatial and temporal boundaries of the plurality of leaf nodes, wherein the plurality of leaf nodes comprise the one or more leaf nodes representing the spatial and temporal boundaries of the requested time-series data, and wherein the plurality of leaf nodes comprise one or more additional leaf nodes representing additional spatial and temporal boundaries of time-series data; and
selecting the one or more leaf nodes and not the one or more additional leaf nodes based at least in part on the spatial and temporal boundaries of the query.

7. The method as recited in claim 5, wherein determining the one or more storage locations comprises:
determining the root node based at least in part on an identifier of the table;

traversing the metadata index beginning from the root node, wherein the root node comprises a plurality of pointers to a plurality of intermediate index nodes, wherein the root node indicates respective spatial and temporal boundaries of the plurality of intermediate index nodes, wherein the plurality of intermediate index nodes comprise comprises a plurality of pointers to a plurality of leaf nodes, wherein the plurality of intermediate index nodes indicate respective spatial and temporal boundaries of the plurality of leaf nodes, wherein the plurality of leaf nodes comprise the one or more leaf nodes representing the spatial and temporal boundaries of the requested time-series data, and wherein the plurality of leaf nodes comprise one or more additional leaf nodes representing additional spatial and temporal boundaries of time-series data; and selecting the one or more leaf nodes and not the one or more additional leaf nodes based at least in part on the spatial and temporal boundaries of the query.

8. The method as recited in claim 5, further comprising:

receiving, by the distributed time-series database, an element of time-series data within additional spatial and temporal boundaries;

determining, by the distributed time-series database using the metadata index, an additional storage location in the one or more data sources, wherein the metadata index includes an additional leaf node underneath the root node and representing the additional spatial and temporal boundaries, and wherein the additional leaf node indicates the additional storage location in the one or more data sources; and storing, by the distributed time-series database, the element of time-series data in the additional storage location in the one or more data sources.

9. The method as recited in claim 5, further comprising:

performing, by the distributed time-series database, a split of a first tile having first spatial and temporal boundaries into a second tile having second spatial and temporal boundaries and a third tile having third spatial and temporal boundaries; and modifying, by the distributed time-series database, the metadata index responsive to the split, wherein the metadata index is modified to remove a first leaf node representing the first spatial and temporal boundaries, and wherein the metadata index is modified to add a second leaf node representing the second spatial and temporal boundaries and a third leaf node representing the third spatial and temporal boundaries.

10. The method as recited in claim 5, further comprising:

performing, by the distributed time-series database, a merge of a first tile having first spatial and temporal boundaries and a second tile having second spatial and temporal boundaries into a third tile having third spatial and temporal boundaries; and modifying, by the distributed time-series database, the metadata index responsive to the merge, wherein the metadata index is modified to remove a first leaf node representing the first spatial and temporal boundaries and a second leaf node representing the second spatial and temporal boundaries, and wherein the metadata index is modified to add a third leaf node representing the third spatial and temporal boundaries.

11. The method as recited in claim 5, further comprising:

determining, by the distributed time-series database, that a quantity of pointers to child nodes in a first index node of the metadata index has exceeded a threshold value;

determining, by the distributed time-series database, a parent node of the first index node using an additional traversal of the metadata index, wherein the parent node comprises a pointer to the first index node and one or more additional pointers to the one or more additional index nodes; and reassigning, by the distributed time-series database, the pointers to child nodes among the first index node and the one or more additional index nodes.

12. The method as recited in claim 5, further comprising:

determining, by the distributed time-series database, that one or more elements of time-series data have expired from a first storage tier and been moved to a second storage tier; and modifying, by the distributed time-series database, one or more leaf nodes corresponding to the one or more elements of time-series data to update one or more storage locations of the one or more elements of time-series data.

13. The method as recited in claim 5, further comprising:

determining, by the distributed time-series database, that one or more elements of time-series data have been removed from the distributed time-series database;

modifying, by the distributed time-series database, an additional leaf node corresponding to the one or more elements of time-series data to delete one or more references to the one or more elements of time-series data; and if the additional leaf node comprises no references to elements of time-series data, removing the additional leaf node from the metadata index.

14. The method as recited in claim 13, further comprising:

determining, by the distributed time-series database, that the additional leaf node has been removed from the metadata index;

modifying, by the distributed time-series database, an additional index node to delete a pointer to the additional leaf node; and if the additional index node comprises no pointers to child nodes, removing the additional index node from the metadata index.

15. One or more non-transitory computer-readable storage media storing program instructions that, when executed on or across one or more processors, perform:

receiving a query comprising spatial and temporal boundaries of requested time-series data in a customer table;

determining, using a metadata index, one or more storage locations in the one or more data sources of the distributed time-series database, wherein the metadata index comprises an index of metadata for determining one or more storage location in the one or more data stores, wherein the metadata index includes a root node representing spatial and temporal boundaries of the customer table, wherein the metadata index includes one or more leaf nodes underneath the root node and representing the spatial and temporal boundaries of the requested time-series data, wherein the metadata index includes one or more additional leaf nodes underneath the root node representing additional spatial and temporal boundaries of time-series data, wherein determining the one or more storage locations comprises selecting the one or more leaf nodes based at least in part on the spatial and temporal boundaries of the query, and wherein the one or more leaf nodes indicate the one or more storage locations in the one or more data sources; and obtaining one or more elements of the requested time-series data from the one or more storage locations in the one or more data sources.

16. The one or more non-transitory computer-readable storage media as recited in claim 15, further comprising additional program instructions that, when executed on or across the one or more processors, perform:

receiving an element of time-series data within additional spatial and temporal boundaries;

determining, using the metadata index, an additional storage location in the one or more data sources, wherein the metadata index includes an additional leaf node underneath the root node and representing the additional spatial and temporal boundaries, and wherein the additional leaf node indicates the additional storage location in the one or more data sources; and storing the element of time-series data in the additional storage location in the one or more data sources.

17. The one or more non-transitory computer-readable storage media as recited in claim 15, further comprising additional program instructions that, when executed on or across the one or more processors, perform:

determining that a quantity of pointers to child nodes in a first index node of the metadata index has exceeded a threshold value;

modifying the first index node to point to a second index node and a third index node instead of the child nodes;

adding the second index node to the metadata index, wherein the second index node comprises a first portion of the pointers to the child nodes; and adding the third index node to the metadata index, wherein the third index node comprises a second portion of the pointers to the child nodes.

18. The one or more non-transitory computer-readable storage media as recited in claim 15, further comprising additional program instructions that, when executed on or across the one or more processors, perform:

determining that one or more elements of time-series data have been removed from the distributed time-series database;

modifying an additional leaf node corresponding to the one or more elements of time-series data to delete one or more references to the one or more elements of time-series data; and if the additional leaf node comprises no references to elements of time-series data, removing the additional leaf node from the metadata index.

19. The one or more non-transitory computer-readable storage media as recited in claim 18, further comprising additional program instructions that, when executed on or across the one or more processors, perform:

performing one or more splits and one or more merges within spatial and temporal boundaries of a particular tile in the distributed time-series database; and modifying the metadata index to represent the one or more splits and the one or more merges.

20. The one or more non-transitory computer-readable storage media as recited in claim 15, wherein the metadata index represents a directed acyclic graph comprising a plurality of nodes including the root node and the one or more leaf nodes, wherein the directed acyclic graph comprises a plurality of paths via a plurality of intermediate index nodes to at least one of the leaf nodes, and wherein the plurality of intermediate index nodes represent different spatial and temporal boundaries.

* * * * *